United States Patent
Selwa et al.

(10) Patent No.: US 10,144,504 B1
(45) Date of Patent: Dec. 4, 2018

(54) DECOUPLED HAND CONTROLS FOR AIRCRAFT WITH VERTICAL TAKEOFF AND LANDING AND FORWARD FLIGHT CAPABILITIES

(71) Applicant: Kitty Hawk Corporation, Mountain View, CA (US)

(72) Inventors: Alexander David Selwa, Mountain View, CA (US); Todd Reichert, Mountain View, CA (US); Mark Johnson Cutler, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/693,804

(22) Filed: Sep. 1, 2017

(51) Int. Cl.
  *B64C 13/12* (2006.01)
  *B64C 13/04* (2006.01)
  *B64C 27/08* (2006.01)
  *G05D 1/08* (2006.01)
  *G05D 1/10* (2006.01)
  *G05G 9/047* (2006.01)

(52) U.S. Cl.
  CPC .......... *B64C 13/0421* (2018.01); *B64C 27/08* (2013.01); *G05D 1/0816* (2013.01); *G05D 1/102* (2013.01); *G05G 9/047* (2013.01)

(58) Field of Classification Search
  CPC ...... B64C 13/12; B64C 13/0423; B64C 27/08
  USPC ................................ 244/234, 237
  See application file for complete search history.

(56) References Cited

U.S. PATENT DOCUMENTS

| | | | | |
|---|---|---|---|---|
| 3,472,086 A | * | 10/1969 | Hadland | F16H 35/08 244/234 |
| 4,154,415 A | * | 5/1979 | Harris | B64C 13/02 244/211 |
| 4,778,133 A | * | 10/1988 | Sakurai | B64C 13/04 244/220 |
| 5,002,241 A | * | 3/1991 | Tizac | B64C 13/04 244/223 |
| 5,125,602 A | * | 6/1992 | Vauvelle | B64C 13/04 244/223 |
| 5,472,156 A | * | 12/1995 | Bivens, III | B64C 13/04 244/229 |
| 5,503,040 A | * | 4/1996 | Wright | B64C 13/04 244/236 |
| 5,971,325 A | | 10/1999 | Gold | |
| 8,258,917 B2 | | 9/2012 | Cai | |
| 8,844,880 B1 | * | 9/2014 | Corliss | B64C 27/48 244/229 |
| 8,958,928 B2 | | 2/2015 | Seydoux | |

(Continued)

OTHER PUBLICATIONS

Author Unknown, "HF series: Hall effect joysticks", APEM, Jan. 22, 2016.

(Continued)

*Primary Examiner* — Christopher P Ellis
(74) *Attorney, Agent, or Firm* — Van Pelt, Yi & James LLP

(57) ABSTRACT

Hand controls for an aircraft, including a single axis hand control which is configured to control movement of an aircraft along a vertical axis where the aircraft includes a plurality of rotors that are attached to the aircraft at a fixed position and the plurality of rotors rotate independently of one another. The hand controls further include a three axis hand control which is configured to control movement of the aircraft within a plane defined by a roll axis and a pitch axis, as well as about a yaw axis.

18 Claims, 17 Drawing Sheets

(56) References Cited

U.S. PATENT DOCUMENTS

| | | | |
|---|---|---|---|
| 9,126,677 B1* | 9/2015 | Curtis | B64C 19/00 |
| 9,360,868 B2 | 6/2016 | Erhart | |
| 9,898,033 B1* | 2/2018 | Long | B64C 13/04 |
| 10,011,348 B1* | 7/2018 | Wong | B64C 13/14 |
| 2009/0187292 A1* | 7/2009 | Hreha | B64C 13/04 |
| | | | 701/4 |
| 2009/0302170 A1* | 12/2009 | Rozovski | B64C 13/04 |
| | | | 244/221 |
| 2014/0008496 A1 | 1/2014 | Ye | |
| 2015/0314857 A1* | 11/2015 | Cherepinsky | B64C 13/04 |
| | | | 244/223 |
| 2016/0031559 A1 | 2/2016 | Zang | |
| 2017/0052541 A1 | 2/2017 | Hu | |
| 2017/0349277 A1* | 12/2017 | Erhart | B64C 39/024 |

OTHER PUBLICATIONS

Author Unknown, "TW series: Hall effect thumbwheels", APEM, Feb. 16, 2016.

* cited by examiner

Rotor Directions of Rotation

DECOUPLED HAND CONTROLS FOR AIRCRAFT WITH VERTICAL TAKEOFF AND LANDING AND FORWARD FLIGHT CAPABILITIES

BACKGROUND OF THE INVENTION

New types of aircraft are being developed with new applications and/or new groups of users in mind. For example, such aircraft may be used for personal transportation, ridesharing, and/or recreational use. In all of these scenarios, it would be helpful if new hand controls and/or any subsequent processing made the flying experience easier and/or more intuitive, especially for amateur or novice users. This would, for example, permit users to more easily fly aircraft without expensive, inconvenient, and/or time consuming flight instruction.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiment of hand controls in an aircraft and/or processing performed on inputs from such hand controls are described herein. In some embodiments, there is a single axis hand control which is configured to control movement of an aircraft along a vertical axis (where the aircraft includes a plurality of rotors that are attached to the aircraft at a fixed position and the plurality of rotors rotate independently of one another) and a three axis hand control which is configured to control movement of the aircraft within a plane defined by a roll axis and a pitch axis, and its rotation about a yaw axis. First, an exemplary aircraft which may include such hand controls and/or processing is described. Then, some example hand controls and/or processing which makes flying the exemplary aircraft easier and/or more intuitive are described.

Figure 1:
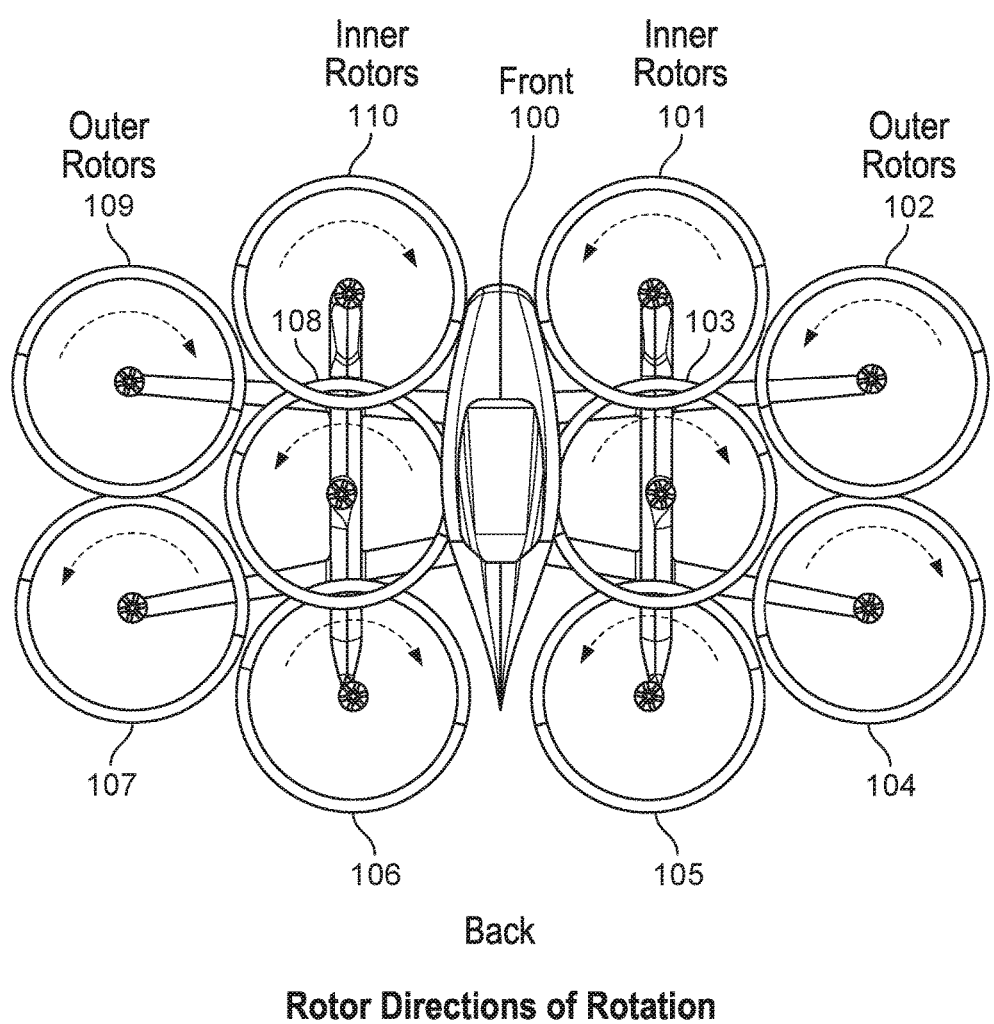
FIG. 1 is a diagram illustrating an embodiment of rotor directions of rotation in a multicopter.

FIG. 1 is a diagram illustrating an embodiment of rotor directions of rotation in a multicopter. In this example, a multicopter with 10 rotors is shown with 5 rotors each on the left (port) side and right (starboard) side of the multicopter. Inner rotors 101, 103, 105, 106, 108, and 110 are located adjacent to the fuselage (100). Outer rotors 102, 104, 107, and 109 are separated from the fuselage (100) by the inner rotors. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

In this example, the inner rotors (101, 103, 105, 106, 108, and 110) overlap with their neighboring or adjacent inner rotor(s). For example, inner rotor 106 overlaps with (and rotates below) inner rotor 108, which in turn overlaps with (and rotates below) inner rotor 110. Similarly, on the other side, inner rotor 105 overlaps with (and rotates below) inner rotor 103, which in turn overlaps with (and rotates below) inner rotor 101. As will be described in more detail below, to achieve the overlaps shown, the rotors are tilted at various angles and/or are placed at different heights in this example.

In some embodiments, having the inner rotors overlap with each other (one example of which is shown here) is attractive because it permits a smaller, more compact footprint of the multicopter than if the inner rotors did not overlap. A smaller footprint may be desirable because the multicopter takes up less space for transport or when parked, and/or a smaller safety zone is required when taking off or landing. Also, the weight can be reduced with a smaller airframe, which is desirable since less power is required to fly the aircraft and/or the range can be extended. The tradeoff with overlapping rotors is that they may interfere with each other aerodynamically (e.g., the airflow from one rotor interferes with another rotor) but this impact may be relatively small and/or acceptable given the benefits of a smaller footprint. For example, the overlap between inner rotors shown here is relatively small and so the interference may be negligible.

In some embodiments, a multicopter is sized so that it can fit into a trailer or on a flatbed and be towed. For example, because the wingspan is wider than the nose-to-tail length of the multicopter, the exemplary multicopter may be fit into an enclosed trailer or on an open flatbed trailer sideways. By having the inner rotors overlap, this makes it easier to fit the multicopter into standard-sized trailers.

Using ten rotors as shown here may be attractive for a variety of reasons. For example, ten rotors maximize the multicopter's disc area within a desired overall size (e.g., the desire to fit the multicopter into or on a standard-width trailer). Using ten rotors also helps with redundancy because it permits the multicopter to maintain flight and possibly allow for some degree of flight precision even if there is rotor failure. It is noted that a rotor failure may require power to be cut to a rotor opposite to the failed rotor for symmetry and ease of flight.

In this example, the outer rotors do not overlap with their adjacent or neighboring inner rotors. For example, outer rotor 109 (102) does not overlap with inner rotor 110 (101) nor with inner rotor 108 (103). Similarly, outer rotor 107 (104) does not overlap with inner rotor 108 (103) nor with inner rotor 106 (105). However, the outer rotors do overlap with each other (e.g., outer rotor 109 (102) overlaps with outer rotor 107 (104)). Having some separation between an outer rotor and adjacent inner rotors (i.e., no overlap) may be desirable because the outer rotors are more susceptible to larger vibrations and/or bouncing. For example, because the outer rotors are located at the distal ends of the arms which extend outward from the fuselage, the outer rotors will vibrate or bounce up and down more than the inner rotors will. The inner rotors are also mounted to the floats (e.g., which run from front to back) which further dampen any vibrations or bouncing, whereas the outer rotors are not mounted to the floats. This larger vertical displacement of the outer rotors could cause an inner rotor and outer rotor to collide which could damage the rotors. To avoid this, there is no overlap between the outer rotors and the inner rotors in this configuration. Although not shown here, in some embodiments, the two outer rotors on a given side (e.g., rotor 107 and rotor 109, or rotor 104 and rotor 102) do not overlap for this reason (e.g., to avoid a potential collision).

The position or placement of the outer rotors is selected so that the outer rotors are packed fairly efficiently and/or tightly next to the two adjacent inner rotors. For example, outer rotor 109 sits in the "V" created by inner rotor 110 and inner rotor 108. This arrangement packs the rotors in an efficient and/or tight manner which in turn reduces the footprint of the multicopter.

This diagram also illustrates the directions of rotation of the various rotors. In this example, rotors 103, 104, 106, 109, and 110 rotate in a clockwise direction when viewed from above. Rotors 101, 102, 105, 107, and 108 rotate in a counterclockwise direction when viewed from above. Or, to put it another way, rotors 101, 102, 105, 106, 109, and 110 rotate towards the fuselage and rotors 103, 104, 107, and 108 rotate away from the fuselage.

It is noted that all of the rotors in a particular column (e.g., going from the front of the multicopter to the rear of the multicopter) have alternating directions of rotation. For example, in the leftmost column shown, rotor 109 and rotor 107 have alternating directions of rotation. Similarly, in the second column from the left, rotor 110 rotates in a clockwise direction, rotor 108 rotates in a counterclockwise direction, and rotor 106 rotates in a clockwise direction. This alternation of rotation direction may enable the multicopter to fly more efficiently. (comment: This seems a bit unclear, perhaps:) The lift a rotor blade produces is proportional to the oncoming air velocity. If the vehicle is moving, the rotor blades will see different air velocities as they rotate. They will create more lift when traveling against the direction of wind and less lift when they spin in the direction of wind. By stacking up alternating rotors one behind the next in the direction of flight (e.g., typically forwards), the multicopter may experience a consistent amount of lift and/or decrease intervals of decreased lift.

TABLE 1

Directions of rotation for the exemplary rotors shown in FIG. 1.

| Rotor | Direction of Rotation (viewed from above) |
| --- | --- |
| Right Inner Front Rotor (101) | Counterclockwise |
| Right Outer Front Rotor (102) | Counterclockwise |
| Right Inner Middle Rotor (103) | Clockwise |
| Right Outer Back Rotor (104) | Clockwise |
| Right Inner Back Rotor (105) | Counterclockwise |
| Left Inner Back Rotor (106) | Clockwise |
| Left Outer Back Rotor (107) | Counterclockwise |
| Left Inner Middle Rotor (108) | Counterclockwise |
| Left Outer Front Rotor (109) | Clockwise |
| Left Inner Front Rotor (110) | Clockwise |

The directions of rotations shown here are selected based on a variety of factors. In some embodiments, rotors that are opposite to each other on the aircraft (e.g., where fuselage 100 acts as an axis of symmetry) may rotate in opposing directions to balance torque. For example, rotor 101 and rotor 110 are opposite to each other and rotate in opposite directions to counter the other's torque.

To illustrate the area occupied by the rotors when the rotors are on, the rotors are shown here as a circle and the number of blades is not shown. In some embodiments, a rotor has two blades and the rotors have a diameter of ~50 inches. A diameter of this size may correspond to the largest diameter possible for a 10 rotor configuration within the constraints of the desired multicopter dimensions (e.g., fit into a standard sized trailer).

It may be helpful to describe how the exemplary multicopter can be flown, beginning with how the pilot gets into the multicopter. In some cases, the multicopter will be floating on water and the pilot will get into the seat in the fuselage by walking on the arms, floats, and/or fuselage of the multicopter as needed. The rotors will be stationary at this time, and the pilot will be in no danger from the rotors when getting into the multicopter.

Once in the multicopter, the pilot may decide to steer (e.g., while floating on the water) the multicopter away from the boarding point to some takeoff location away from bystanders and/or other multicopters. In some embodiments, to do this, only the inner middle rotors are turned on and used to maneuver the multicopter to the desired takeoff location. For example, since rotor 103 and rotor 108 are shielded by other rotors, it will be harder for those rotors to hit any bystanders even if they are on. In some embodiments, only rotors 103 and 108 (i.e., the unexposed rotors) are used to maneuver the multicopter around to protect bystanders. Alternatively, the outer rotors (102, 104, 107, and 109) may be turned off and only the inner rotors (101, 103, 105, 106, 108, and 110) are used in some embodiments to maneuver the aircraft when on the water. Although this may pose more of a risk, it may be easier and/or more efficient to maneuver the aircraft using more rotors. In some embodiments, a multicopter has wheels and the multicopter is able to maneuver on the ground in this manner (e.g., using only shielded rotors or the inner rotors for safety).

Once the multicopter reaches the desired takeoff location, the multicopter performs a substantially vertical takeoff Once a desired altitude is reached, the pilot may rotate (e.g., while hovering at the same altitude) the multicopter about a vertical or yaw axis (not shown here) so that the multicopter is facing or pointing in some desired direction (e.g., toward a desired destination). The multicopter then flies forward, maintaining a constant altitude until the multicopter approaches a desired landing site (e.g., over water or on land). The pilot may slow the forward movement of the multicopter, coming to a forward stop generally above the desired landing site while still hovering and maintaining a constant altitude. The multicopter then descends vertically. If needed, the pilot may stop the vertical descent and (if desired) move the multicopter laterally left or right (e.g., while maintaining a constant altitude) in order to avoid objects on the ground and/or to better align the multicopter over the desired landing site. Similarly, during the vertical landing, the pilot may stop the vertical descent and (if desired) rotate the multicopter about a vertical or yaw axis so that the multicopter is facing in some desired direction and/or to make it easier to shift left or right in order to land on the desired landing site.

Each of the rotors is attached in a fixed manner to the exemplary multicopter with some fixed roll angle and fixed pitch angle. The following figure shows an example of this.

Figure 2:
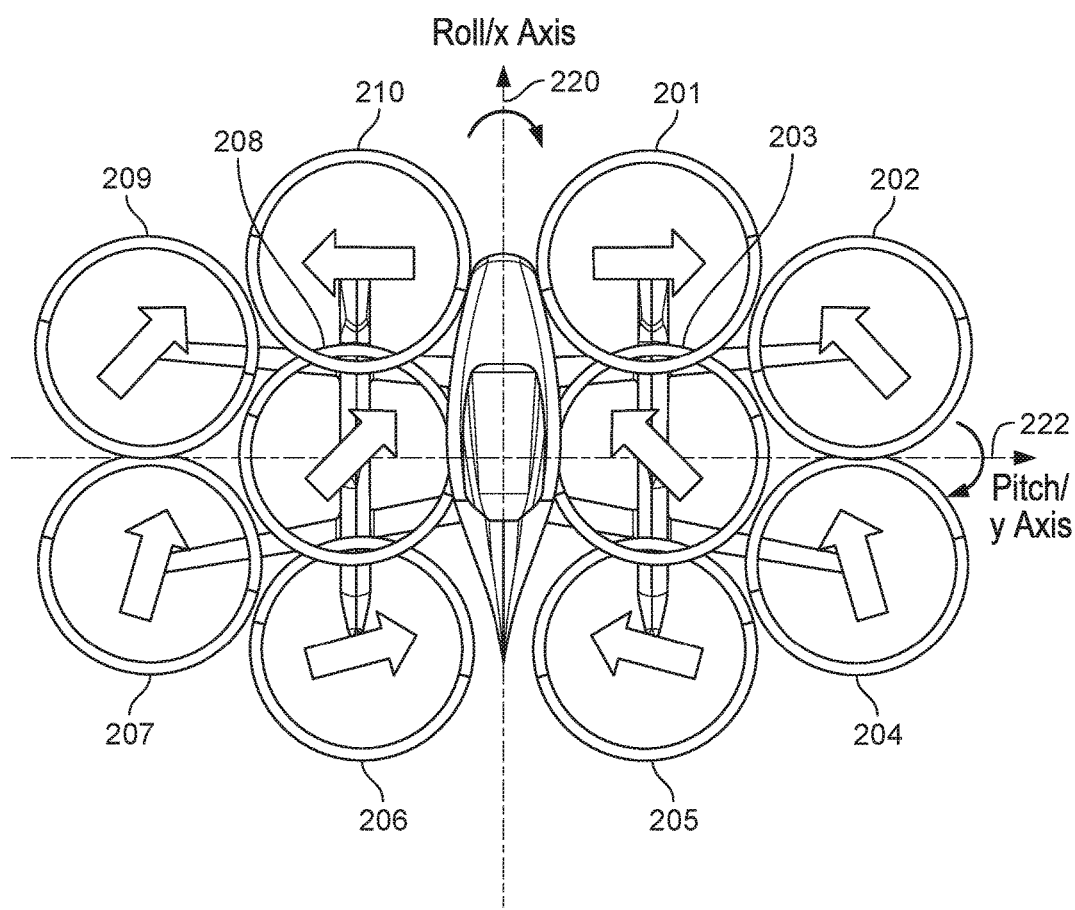
FIG. 2 is a diagram illustrating an embodiment of the fixed tilt positions of the rotors in a multicopter.

FIG. 2 is a diagram illustrating an embodiment of the fixed tilt positions of the rotors in a multicopter. In this example, each rotor's tilt position is described using two angles: a roll angle and a pitch angle. The roll angle is defined by the roll axis (220), sometimes referred to as an x-axis, where a positive roll angle follows the right-hand direction of rotation (see, for example, the curved arrow about roll axis 220) and a negative roll angle is in the opposite direction. Similarly, the pitch angle for each rotor is defined by the pitch axis (222), sometimes referred to as a y-axis, where a positive pitch angle follows the right-hand direction of rotation (see, for example, the curved arrow about pitch axis 222) and a negative pitch angle is in the opposite direction.

The following table lists the roll angle and pitch angle for each rotor in this example. It is noted that opposite rotors (e.g., where the fuselage acts as an axis of symmetry) have roll angles of the same magnitude but opposite signs (e.g., rotor 210 has a roll angle of −3° and rotor 201 has a roll angle of 3°) and the same pitch angle (e.g., both rotor 210 and rotor 201 have pitch angles of 0°). Generally speaking, the roll angles and pitch angles have magnitudes within the range of 0 degrees and 10 degrees.

TABLE 2

Tilt positions for the exemplary rotors shown in FIG. 2.

| Rotor | Roll Angle (in degrees) | Pitch Angle (in degrees) |
| --- | --- | --- |
| Right Inner Front Rotor (201) | 3.0 | 0.0 |
| Right Outer Front Rotor (202) | −2.0 | −3.0 |
| Right Inner Middle Rotor (203) | −4.0 | −9.0 |
| Right Outer Back Rotor (204) | −2.0 | −10.0 |
| Right Inner Back Rotor (205) | −7.0 | −2.0 |
| Left Inner Back Rotor (206) | 7.0 | −2.0 |
| Left Outer Back Rotor (207) | 2.0 | −10.0 |
| Left Inner Middle Rotor (208) | 4.0 | −9.0 |
| Left Outer Front Rotor (209) | 2.0 | −3.0 |
| Left Inner Front Rotor (210) | −3.0 | 0.0 |

For convenience, an arrow is shown over each rotor which gives a general or rough sense of each rotor's tilt position For example, if each rotor is conceptually thought of as a plane, a hypothetical ball placed on that plane would roll (e.g., generally or roughly) in the direction of the arrow shown. In general, all of the rotors are tilted slightly forward, with the inner middle rotors (203 and 208) more so.

There are a number of benefits associated with the tilt positions shown in this example. First, all of the rotors have a slight (e.g., ~5 degrees) forward bias so that when the aircraft is flying forwards, the body of the aircraft remains level. Also, the tilt positions of the rotors angles are selected to maximize the aircraft's ability to yaw while minimizing the impact of losing any single rotor. The more a rotor is tilted, the more it contributes to yawing the vehicle when it is sped up or down.

The rotors are mounted to the multicopter (e.g., more specifically, to the floats for the inner rotors and to the arms for the outer rotors) in a fixed manner at the roll angles and pitch angles shown. In other words, the rotors cannot change their tilt positions from the positions shown. To maneuver, each rotor is independently controllable (e.g., different amounts of torque can be applied to each rotor), such that each rotor can rotate at a different speed or output a different amount of thrust.

The various tilt positions shown here enable the multicopter to maneuver more efficiently compared to some other multicopter designs. For example, consider another multicopter where the rotors only tilt forward or backward to some degree (i.e., all of the rotors have a roll angle of 0°). To move sideways (e.g., left or right), such a multicopter may have to expend more power because none of the rotors have a non-zero roll angle which would help to move the multicopter laterally to the left or right. In contrast, the multicopter shown here can move sideways in a more efficient manner because the rotors have non-zero roll angles. For example, to move laterally to the right, more torque would be applied to rotors 206-209, which would create a thrust differential and move the multicopter to the right. Since rotors 206-209 have positive roll angles (e.g., the tops of those rotors are tilted inward toward the fuselage), some of their overall thrust becomes lateral thrust and some becomes vertical thrust. That is, the positive roll angles of rotors 206-209 more efficiently generate lateral thrust and movement to the right compared to rotors with roll angles of 0.

The following figure describes the interior of the cockpit for the exemplary multicopter described above.

Figure 3:
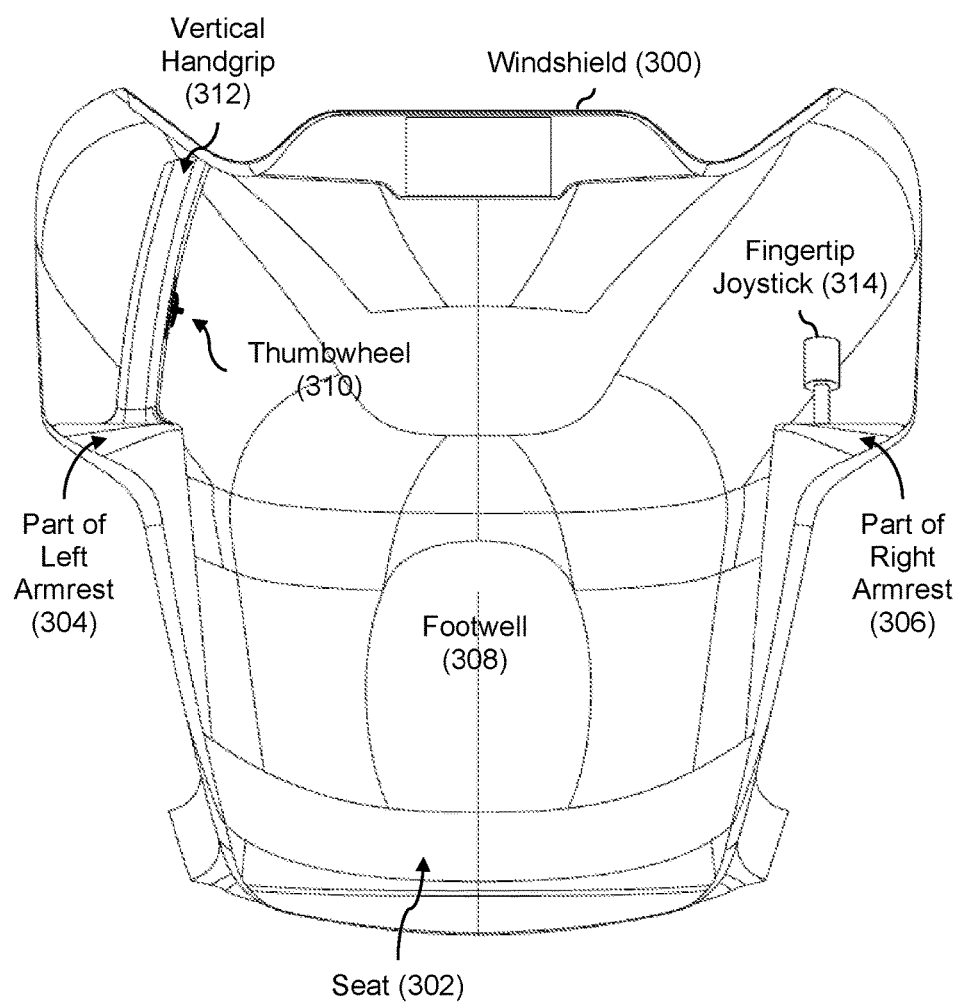
FIG. 3 is a diagram illustrating an embodiment of the interior of a cockpit, including a thumbwheel and a fingertip joystick.

FIG. 3 is a diagram illustrating an embodiment of the interior of a cockpit, including a thumbwheel and a fingertip joystick. In the example shown, a cutaway view of the cockpit is shown looking toward the front of the multicopter. To provide context, the windshield (300), seat (302), left armrest (304), right armrest (306), and footwell (308) are labeled.

In this example, the pilot's left hand controls a single axis thumbwheel (310). The thumbwheel (310) is mounted to the (left) handgrip (312) on the side or surface of the handgrip that faces into the cockpit.

The vertical (e.g., columnar) handgrip (312) to which the thumbwheel (310) is attached may be used in a variety of ways. For example, when exiting the multicopter, a pilot may grab the handgrip to pull themselves out of the seat. Or, during flight, a pilot may grab the handgrip to brace themselves. To attach the handgrip securely to the multicopter, the handgrip in this example extends upward from the left armrest (304) to the underside of the cockpit's interior. This securely anchors the handgrip to the multicopter at both ends of the handgrip.

The pilot's right hand controls a three axis fingertip joystick (314). A fingertip joystick offers fingertip control and is generally smaller and offers less resistance than a hand-controlled joystick (e.g., where the pilot's hand would wrap around a hand-controlled joystick).

In some embodiments, a hand control (e.g., thumbwheel 310 and/or fingertip joystick 314) has multiple sensors and multiple lines. Although a flight computer may not necessarily be able to determine which sensor or line has failed in the event of a sensor or line failure, the multicopter will at least be able to detect that a failure has occurred (which is better than not being able to detect a failure at all, which is the case with a single sensor and a single line).

In this example, the cockpit is a relatively narrow cockpit (e.g., the width of the cockpit is substantially the width of the seat, such as ±3 inches on either end of the seat) which means that the pilot's ability to enter and exit the cockpit is of some consideration. One benefit to this example is that the relatively small size and peripheral placement (e.g., close to the walls of the cockpit) of the hand controls enables easy access in and out of the cockpit. In contrast, a large hand control and/or one which was mounted or sat in the middle of the cockpit (e.g., coming up from the floor or out from the front wall) would also make it harder to enter and exit the single seat cockpit. A related benefit to the configuration shown here is that the pilot may not worry as much about accidentally jostling the thumbwheel or fingertip joystick when seated in the multicopter, or when getting in or out. Although the multicopter and cockpit example shown here shows a single-seat cockpit, the exemplary thumbwheel and fingertip joystick would also be useful in other narrow cockpits, such as a tandem, two-seat cockpit where the width of the cockpit is substantially the same as the width of the seat (e.g., ±3 inches).

The following figures describe the exemplary thumbwheel and fingertip joystick in more detail.

Figure 4:
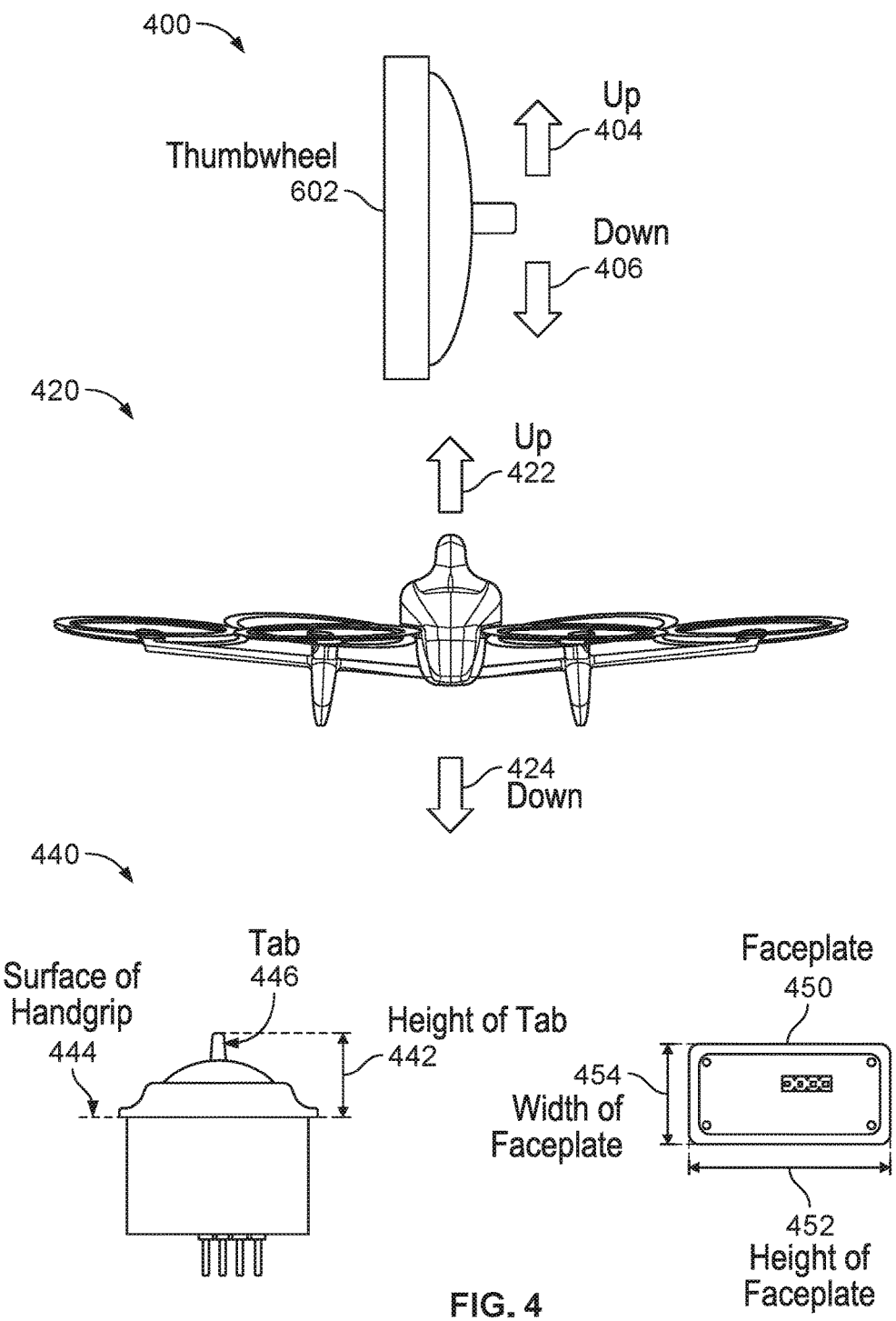
FIG. 4 is a diagram illustrating an embodiment of a thumbwheel and the corresponding movement of a multicopter in response to the thumbwheel.

FIG. 4 is a diagram illustrating an embodiment of a thumbwheel and the corresponding movement of a multicopter in response to the thumbwheel. Diagram 400 shows a side view of a thumbwheel (402) (e.g., as it would be mounted to a handgrip) which may be pushed up (404) or down (406) by a pilot's left thumb. In this example, the thumbwheel is spring centered so that the thumbwheel returns to the centered position shown here if the pilot releases the thumbwheel.

Diagram 420 shows the multicopter's movement in response to the thumbwheel. For clarity and ease of explanation, it is assumed that the fingertip joystick (e.g., 314 in FIG. 3) is not touched during the following explanation (e.g., the fingertip joystick is also spring centered so that the multicopter is not moving forward-back or laterally left-right within an x-y or roll-pitch plane). When the thumbwheel is pushed up (422), the multicopter ascends or otherwise moves up (422) along a vertical axis. Conversely, when the thumbwheel is pushed down (424), the multicopter descends or otherwise moves downward (424) along a vertical axis.

Generally speaking, the speed at which the multicopter moves upward or downward along the vertical axis corresponds to the degree or amount of displacement experienced by the thumbwheel. For example, if the thumbwheel is only pushed up halfway, the multicopter will fly upward at a slower speed than if the thumbwheel were pushed all the way up.

Diagram 440 shows some dimensions of interest associated with the exemplary thumbwheel. On the left, the height of the tab (442) is shown where that dimension extends from the surface of the handgrip (444) to the tip of the tab (446). On the right, the faceplate is shown (450) where the height of the faceplate (452) is the longer dimension and the width of the faceplate (454) is the shorter dimension. In this example, those dimensions have the following ranges:

TABLE 3

Example Thumbwheel Dimension Ranges

| | |
|---|---|
| Height of tab | 0.125 inch-1 inch |
| Height of faceplate | 0.5 inch-2 inches |
| Width of faceplate | 0.25 inch-1 inch |

In one specific example, the thumbwheel is a TW series Hall effect thumbwheel with a tab from APEM. This thumbwheel is a low profile thumbwheel where the height of the tab (442) is ~16.10 mm (~0.63 inches) tall, the height of the faceplate (452) is ~38.80 mm (~1.53 inches) tall, and the width of the faceplate (454) is ~18.03 mm (~0.71 inches) wide.

In some embodiments, some other type of hand control is used, such as two buttons: one for up and one for down where the two buttons are mutually exclusive (i.e., they cannot be pressed at the same time) with springs to return the buttons to the "out" position when not pressed. Although the vertical speed of the aircraft is not controllable with a two button configuration (e.g., because the buttons do not measure displacement, just whether or not they are pressed), it may be desirable because it is a simpler configuration which is better suited for inexperienced pilots. For example, the vertical speed when either the up button or down button is pressed can be set to some relatively slow speed which may prevent accidents (e.g., going too fast and running into something) or situations in which the user is startled (e.g., or the user's finger slips and the multicopter jerks or ascends/descends faster than the user is comfortable with).

Figure 5A:
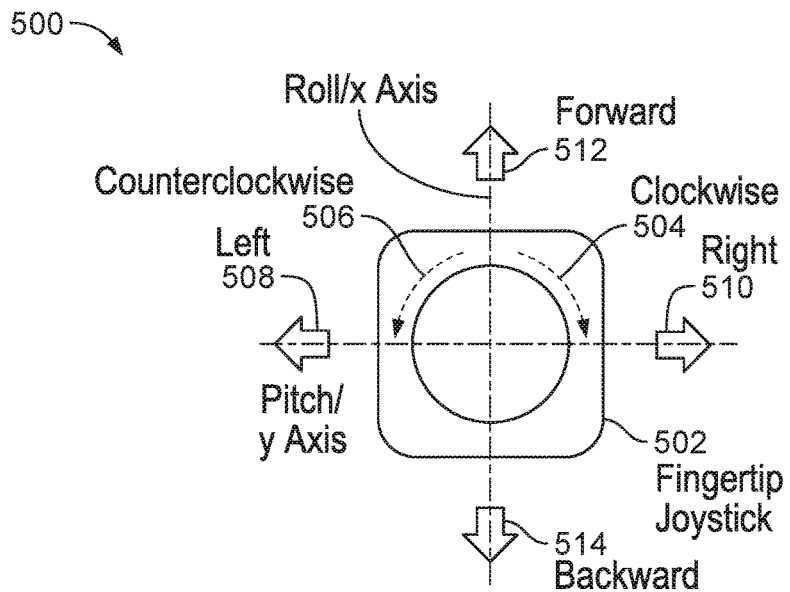
FIG. 5A is a diagram illustrating an embodiment of a fingertip joystick and the corresponding movement of a multicopter in response to the fingertip joystick.
Figure 5A:
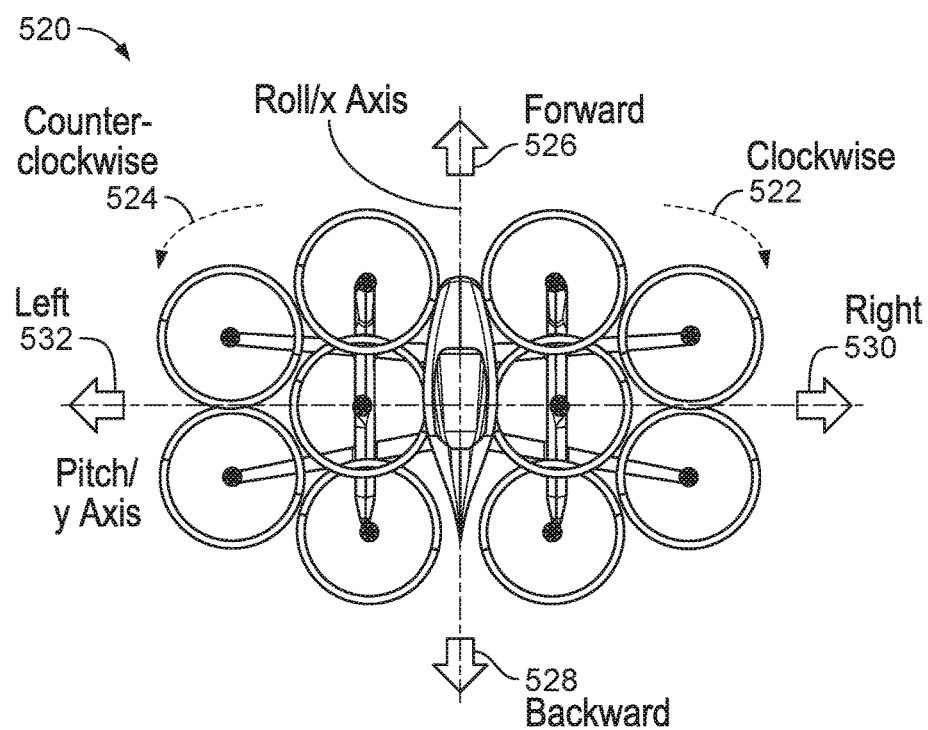

FIG. 5A is a diagram illustrating an embodiment of a fingertip joystick and the corresponding movement of a multicopter in response to the fingertip joystick. Diagram 500 shows a top view of a fingertip joystick (502) which may be controlled using the fingers and/or fingertips of the pilot's (right) hand. As described above, the joystick is a three axis joystick. The first axis is a vertical (e.g., yaw) axis extending upward from the top of the joystick where the joystick's knob or tip can be twisted about this axis in the clockwise (504) direction or counterclockwise (506) direction. In one example, the input received along this axis is in the form of an angle (e.g., how much the knob is twisted relative to a centered position) and may be a positive value or a negative value (e.g., z falls within [−180°, 180°]).

The joystick also receives information relating to two other axes: the x (e.g., roll) axis and y (e.g., pitch) axis by pushing the joystick in any direction and/or to any degree. In one example, two (e.g., independent) inputs are received along these two axes in the form of a displacement (e.g., relative to a centered position) which could either be positive or negative (e.g., x falls within [−10, 10] and y falls within [−10, 10]).

Diagram 520 shows the multicopter's movement in response to the joystick. As before, it is assumed that the thumbwheel (e.g., 310 in FIG. 3) is not touched during the following explanation such that the multicopter maintains a constant altitude. Generally speaking, the joystick controls the multicopter's movement within a plane formed or otherwise defined by the roll axis and pitch axis. Turning the twistable knob of the joystick clockwise (504) causes the multicopter to correspondingly rotate about a vertical or yaw axis (not shown) in a clockwise direction (522). Similarly, turning the twistable knob counterclockwise (506) on the fingertip joystick causes the multicopter to rotate in a counterclockwise direction (524) as well. The yaw axis is sometimes referred to as a z-axis. Generally speaking, the degree or amount of (e.g., angular) displacement by the twistable knob affects the angular speed with which the multicopter rotates (e.g., turning the knob more causes the multicopter to rotate faster).

In diagram 520, the corresponding movement by the multicopter in response to the tilting of the joystick in diagram 500 is shown (e.g., which would generate inputs along the x-axis and y-axis). Tilting the joystick forward (512) causes the multicopter to fly forward (526) and tilting the joystick backward (514) causes the multicopter to fly backward (528). Similarly tilting the joystick to the right (510) will cause the multicopter to fly to the right (530) and tilting the joystick to the left (508) will cause the multicopter to fly to the left (532). Tilting or pointing the joystick in other directions where there is some x component and some y component (e.g., tilting joystick forward-right) will result in a corresponding movement by the multicopter (e.g., the multicopter will fly forward-right within the plane). As before, the degree or amount of displacement results in faster or slower movement in the corresponding direction.

Figure 5B:
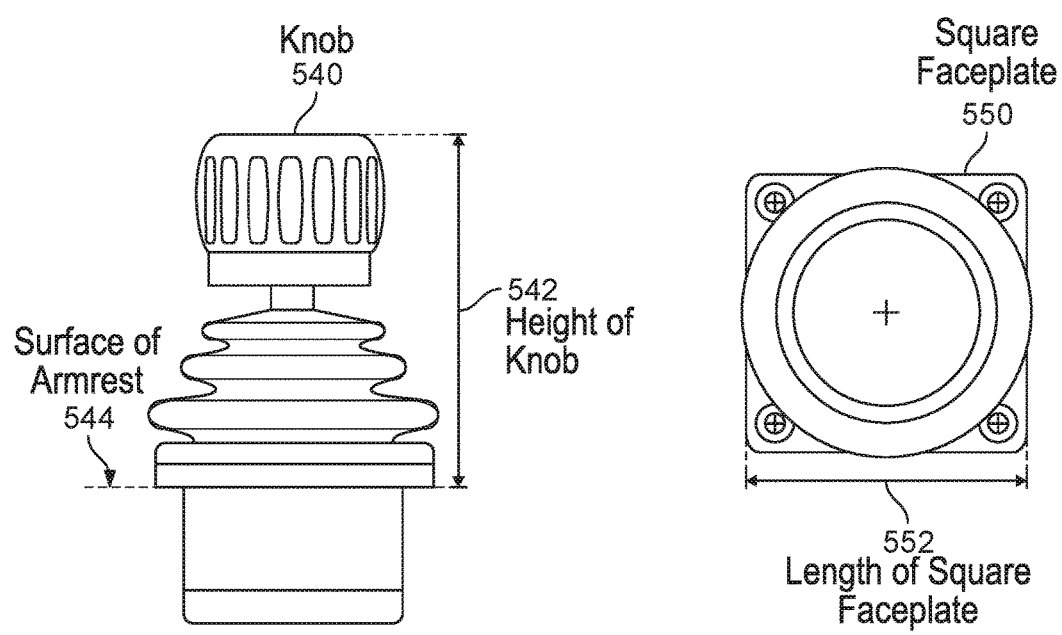
FIG. 5B is a diagram illustrating an embodiment of dimensions associated with a fingertip joystick.

FIG. 5B is a diagram illustrating an embodiment of dimensions associated with a fingertip joystick. In this example, the fingertip joystick has a knob (540) where the height of the knob (542) extends from the surface of the armrest (544) to the top of the knob (540). The fingertip joystick also has a faceplate (550) which is square. Length 552 shows the length of one side of the square faceplate. In this example, those dimensions have the following ranges:

TABLE 4

Example Fingertip Joystick Dimension Ranges

| Height of knob | 2.25 inches-3.25 inches |
|---|---|
| Length/Side of square faceplate | 1.5 inches-2.5 inches |

In one specific example, the fingertip joystick is an HF series Hall effect joystick with three axes and a low profile from APEM. This fingertip joystick is a low profile joystick with a knob height (542) of ~69.95 mm (~2.75 inches) and faceplate sides (552) with a length of ~48.26 mm (~1.90 inches).

In some embodiments, some other type of three axis hand control is used, such as a full size joystick.

It is noted that if the pilot releases both the thumbwheel (e.g., shown in FIG. 4) and the fingertip joystick (e.g., shown in FIGS. 5A and 5B), the spring centering will cause both hand controls to return to a neutral or centered position. This corresponds to the multicopter gradually coming to a stop and hovering at a constant or steady position. This is a good safety feature to have because the multicopter will not fly off in an uncontrolled manner should (as an example) the pilot panic or pass out.

One benefit to the hand controls described above is that they offer intuitive control of the vehicle. As described in FIG. 4, the pilot's manipulation of the thumbwheel (e.g., up or down) mimics the corresponding movement of the multicopter (e.g., up or down). Similarly, as is described in FIG. 5A and FIG. 5B, twisting the knob or tip of the joystick causes the multicopter to rotate in a corresponding direction and tilting the joystick in a particular direction causes the multicopter to move in that direction as well.

In contrast, some other types of hand controls are not as intuitive. For example, some helicopters have one hand control for the cyclic pitch (e.g., angle or tilt) of the rotor and another hand control for the collective pitch of the rotor. To transition from hovering to forward flight with such controls is not an easy and/or intuitive thing to do. For transition from hover to forward flight, the helicopter's rotor must be angled or tilted forward. However, this causes some of the thrust (e.g., which was previously directed entirely downward and therefore all of the thrust kept the helicopter airborne) to shift to the horizontal direction (e.g., so that less thrust is keeping the helicopter airborne). To compensate, the rotor collective pitch must be increased and the pilot must make this adjustment using the second control. This type of coordination takes experience and/or training in manipulating both controls simultaneously, which some novice pilots may lack. In contrast, a novice pilot may be able to more easily and/or quickly learn how to fly an aircraft using the hand controls shown here.

To illustrate this, consider a flight of the multicopter described above from taking off to landing. The multicopter described above takes off vertically. During the vertical takeoff, the pilot can focus all of their attention on their left hand to control the thumbwheel; the pilot does not worry about or touch the fingertip joystick during this time. Once the pilot reaches a desired altitude, the pilot lets go of the thumbwheel. The spring centering of the thumbwheel will cause the multicopter to slow its ascent and gradually come to a stop, hovering at a constant position.

The pilot then switches their attention to their right hand and the fingertip joystick to fly the multicopter at a constant altitude (e.g., within an x-y or roll-pitch axis), without worrying about their left hand and/or the thumbwheel. This mode or manner of flying is sometimes referred to as a forward flight mode (e.g., where the multicopter stays at a constant altitude but can (if desired) move around within the plane defined by that altitude). For example, the pilot can rotate the multicopter to face a desired direction and then fly the multicopter forward at a constant altitude using just their right hand and just the fingertip joystick.

Once the destination is reached, the pilot can turn their attention back to their left hand and use the thumbwheel (e.g., alone) to descend vertically to land. In other words, a pilot can (if desired) focus on one hand control at a time throughout the entire flight from takeoff to landing (e.g., assuming the aircraft has the ability to perform a vertical takeoff and landing and has the ability to fly in a forward flight mode). As described above, some other hand controls (such as helicopter hand controls) require the pilot to simultaneously manipulate both hand controls at least some of the time. For a novice pilot, this can make it harder to fly the aircraft.

More formally, a way of describing this is to say that the two hand controls are decoupled because they control movement along orthogonal or independent axes. The thumbwheel controls vertical movement (e.g., along the z (vertical) axis), which is completely independent of or orthogonal to movement within or along the x (roll) axis and y (pitch) axis, which is controlled by the fingertip joystick. The multicopter described above is merely exemplary and the hand controls described herein may be used in combination with other types of aircraft.

Another benefit to the hand controls shown here is that a pilot can comfortably hold the hand controls for extended periods of time. Some larger hand controls (e.g., hand-controlled joysticks) may have a larger minimum/maximum displacement which is more uncomfortable to hold for longer periods of time, even with an armrest. Also, in some embodiments, fingertip joysticks offer relatively little feedback or resistance so that only a small amount of force is required to tilt or twist the fingertip joystick. In contrast, some other hand controls may be force-feedback hand controls which offer haptic feedback in the form of variable resistance. It may be more uncomfortable to use other types of hand controls for long periods of time which offer more resistance and/or require more force to manipulate.

The following figures describe some examples of processing (e.g., performed by a flight computer or flight controller) on the pilot's inputs received via the exemplary hand controls described above. Such processing may make the aircraft easier and/or safer to fly.

Figure 6:
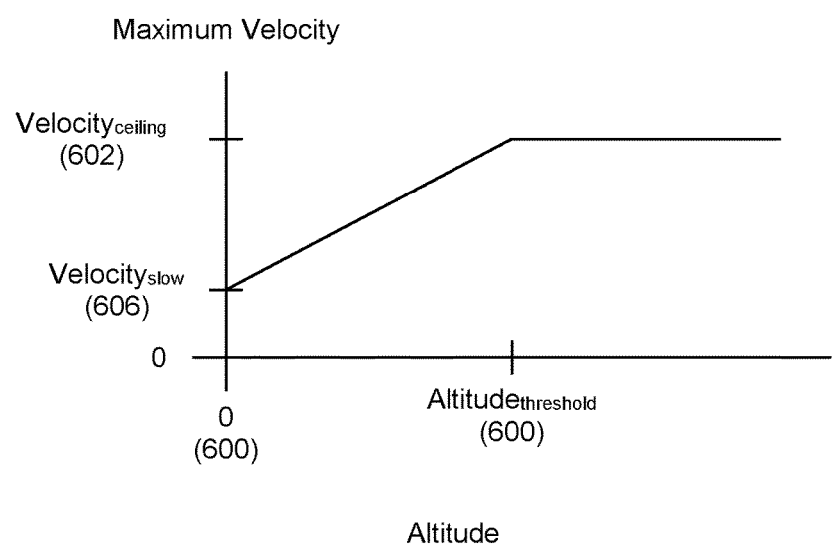
FIG. 6 is a diagram illustrating an embodiment of a maximum velocity which is set based on altitude.

FIG. 6 is a diagram illustrating an embodiment of a maximum velocity which is set based on altitude. In this example, a flight computer adjusts or otherwise sets a maximum velocity for the multicopter based on the altitude of the multicopter (or, more generally, aircraft); this technique is sometimes referred to as altitude-based velocity profile. In the graph shown, the x-axis is the altitude of the multicopter and the y-axis is the maximum velocity at or for that altitude. In some embodiments, the maximum velocity set here is a maximum linear velocity (e.g., miles per hour) that the multicopter can move in a particular direction (e.g., along one or more of an x (roll) axis, y (pitch) axis, and/or z (yaw) axis). In some embodiments, the maximum velocity set here is a maximum angular velocity (e.g., degrees per second) that the multicopter can rotate at (e.g., about a vertical or yaw axis).

In this example, when the altitude of the multicopter is greater than an altitude threshold (600), the maximum velocity is capped at a velocity ceiling (602). For example, for safety reasons, a multicopter may be capped at 25 miles per hour no matter what altitude the multicopter is at.

If the altitude of the multicopter is less than the altitude threshold (600), a linear function (e.g., which passes through the points (0, $velocity_{slow}$) and ($altitude_{threshold}$, $velocity_{ceiling}$)) is used to set the maximum velocity. In other words, as the multicopter descends, the maximum velocity goes down. This may be desirable for a variety of safety reasons. This may protect the pilot and/or the multicopter because it prevents a pilot from coming in too fast during a landing and/or gives the pilot more time to identify and avoid objects (e.g., trees, people on the ground, etc.). It may also protect people on the ground because the slower velocities at lower altitudes may give people on the ground more time to become aware of the multicopter and (if needed) get out of the multicopter's way. To illustrate this, it may be helpful to walk through a landing. Suppose that the pilot is making a vertical landing beginning at an altitude above the altitude threshold (600). If the pilot decided to push the thumbwheel all the way down, the multicopter would initially descend at the velocity ceiling until it reached the altitude threshold (600). The multicopter would then slow down because the maximum velocity would be reduced as described above even if the thumbwheel continued to be held all the way down. This would prevent a hard landing, even if the pilot held the thumbwheel down at full displacement the entire time.

In this example, $velocity_{slow}$ (606) is non-zero because as a practical matter it may not be desirable to have the maximum velocity approach zero as the altitude nears zero. For example, when the multicopter is almost touching the ground, the aircraft will still need to maneuver in order to land and will thus need a non-zero maximum velocity even when very close to the ground.

It is noted that the maximum velocity is applicable to all directions, not just vertical movement (e.g., up/down). For safety reasons, it may be desirable to prevent a multicopter from flying forward, backward, left, or right too fast at lower altitudes. For example, if the multicopter is landing in a clearing between tall trees or in an urban canyon between tall buildings, then it may be desirable to limit the multicopter's velocity within an x-y plane in order to prevent collisions with trees or buildings on the side of the multicopter as the multicopter is landing. Similarly, for safety reasons, it may be desirable to limit how fast the multicopter can rotate about a vertical axis as the multicopter descends.

Generally speaking, a cap or maximum may be set for various moments associated with the aircraft (e.g., not just velocity), in order to generate control signals for the multicopter which result in a smooth and/or safe flight. In one example, the following six moments have limits or maximums associated with them.

TABLE 5

Example moments associated with an aircraft which are set to some maximum value

| Moment | Examples and Comments |
|---|---|
| $r$ (position) | Limit the altitude the aircraft can ascend to |
| $\dot{r}$ (velocity) | Limit the velocity going forward, backward, upward, and/or downward |
| $\ddot{r}$ (acceleration) | Limit the acceleration in any direction; proportional to θ (angle) |
| $\dddot{r}$ (jerk) | Proportional to $\dot{\theta}$ (angular rate) |

TABLE 5-continued

Example moments associated with an aircraft
which are set to some maximum value

| Moment | Examples and Comments |
|---|---|
| $r^{(4)}$ (jounce/snap) | Proportional to $\dddot{\theta}$ (angular acceleration) |
| $r^{(5)}$ (crackle) | Proportional to $\omega$ (propeller slew rate) |
| $r^{(6)}$ (pop) | Proportional to motor command rate |

The following figure describes this example more generally and/or formally in a flowchart.

Figure 7:
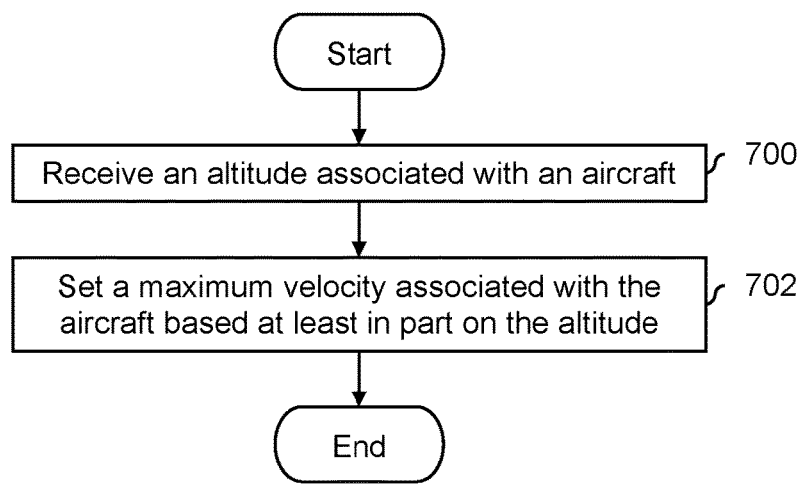
FIG. 7 shows a flowchart illustrating an embodiment of a process to set a maximum velocity based at least in part on altitude.

FIG. 7 shows a flowchart illustrating an embodiment of a process to set a maximum velocity based at least in part on altitude. In some embodiments, the process is performed by a flight controller. As described above, the maximum velocity may relate to a maximum linear velocity (e.g., miles per hour) or a maximum angular velocity (e.g., degrees per second). In some embodiments, the process is used in combination with the hand controls shown in FIG. 3-5B; alternatively, this process may be used in combination with some other hand controls.

At 700, an altitude associated with an aircraft is received. In some embodiments, the altitude of the aircraft may be obtained using GPS and/or radar. For example, near the ground, a radar provides a more accurate altitude measurement. In some embodiments, (e.g., if the altitude is below some threshold or all the time for low-flying aircraft), radar is used for altitude measurement.

At 702, a maximum velocity associated with the aircraft is set based at least in part on the altitude. See, for example, FIG. 6 where the maximum velocity is capped at a velocity ceiling if the altitude is above an altitude threshold; below the threshold, the maximum velocity is set by a linear function. Naturally, non-linear functions may be used but to avoid any sudden deceleration it may be desirable to use a continuous function (e.g., with no step discontinuity which would cause the maximum velocity to suddenly change). Also, as described above, in some embodiments the velocity approaches a non-zero velocity as multicopter descends because the multicopter is always granted at least some degree of mobility, even when very close to the ground.

Occasionally, a pilot may accidentally jerk on a hand control. The following figures describe some examples in which a delayed or slowed response is used to make an aircraft safer from sudden changes in the hand control signal(s).

Figure 8:
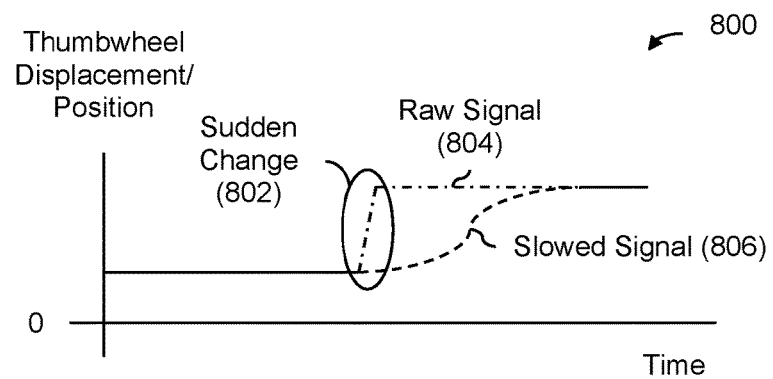
FIG. 8 is a diagram illustrating an embodiment of a slowed velocity response to a hand control signal which changes suddenly.
Figure 8:
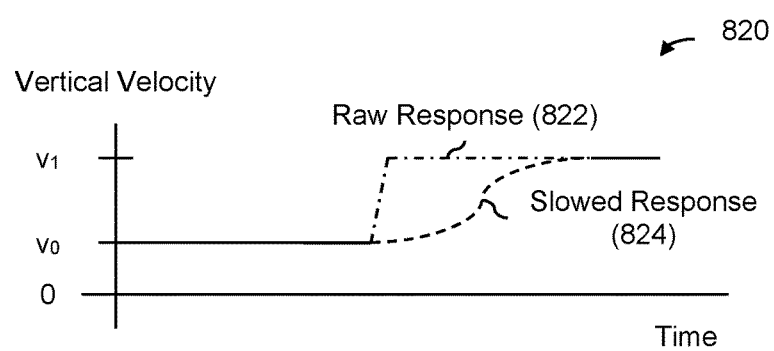
Figure 8:
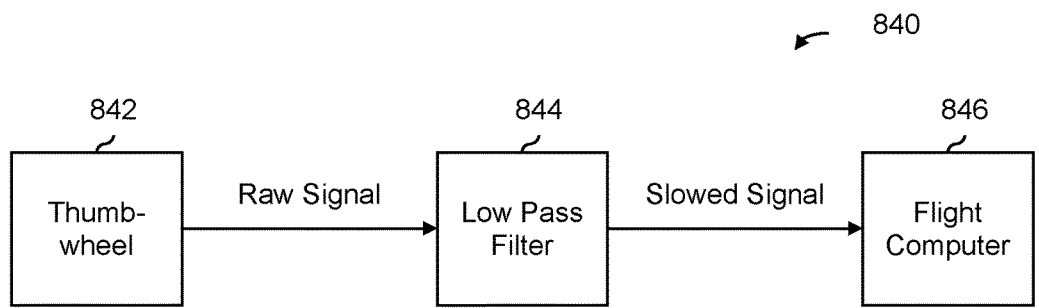

FIG. 8 is a diagram illustrating an embodiment of a slowed velocity response to a hand control signal which changes suddenly. Diagram 800 shows an example of a hand control signal, in this example from a thumbwheel. In this example, the x-axis is time and the y-axis shows the thumbwheel displacement or position (e.g., where a positive value indicates the thumbwheel is being held up and a negative value (not shown) indicates the thumbwheel is being held down). At 802, there is a sudden change in the raw signal (804) from the hand control. For example, the pilot may have been holding the thumbwheel up slightly and then quickly pushes the thumbwheel all the way up quickly.

Diagram 820 shows the vertical velocity of the aircraft. In this example, the x-axis corresponds to time and the y-axis corresponds to vertical velocity which is controlled by the thumbwheel associated with diagram 800. If the aircraft responded exactly as instructed per raw signal 804, raw response 822 would result. Having the aircraft's velocity change quickly like this can be unsettling to the pilot and (in a worst case scenario) may destabilize the aircraft.

Instead, the slowed response (824) is more desirable because it offers a safer and more pleasant flying experience. The slowed response (824) begins and ends at the same velocity as raw response 822 (e.g., they both begin at velocity $v_0$ and end at velocity $v_1$), but the slowed response does so on a longer timescale.

To have the aircraft fly according to slowed response 824, slowed signal 806 in diagram 800 is used to control the aircraft. Diagram 840 shows one example of how slowed signal 806 may be generated. Thumbwheel 842 outputs a raw thumbwheel signal (or, more generally, a raw signal) which is passed to a low pass filter (844). The low pass filter removes high frequency elements (e.g., fast or sudden changes), leaving behind low frequency elements (e.g., slower changes). The low pass filter may be tuned as desired to have any desired passband or cutoff frequency. In some applications, a low pass filter is desirable because frequencies below the cutoff frequency pass through with little or no modification (e.g., so a relatively slow change in hand control position information would cause the aircraft to respond precisely as instructed and/or without trying to slow down the response).

The low pass filter (844) outputs a slowed thumbwheel signal (or, more generally, a slowed signal) which is output and passed to the flight computer (846) which generates control signals for the aircraft (not shown). For example, control signals for the ten rotors shown in the multicopter of FIG. 1 are generated. In some embodiments, some other signal is filtered by the low pass filter. For example, the low pass filter may come after or be a part of the flight computer.

In some embodiments, a slowed signal is generated by limiting an aircraft's angular or linear acceleration. By setting a maximum on the acceleration (e.g., angular or linear), the aircraft's velocity (e.g., angular or linear) cannot change too quickly.

The configuration shown here is conceptual and/or exemplary and may be implemented in a variety of ways. In some embodiments, the low pass filter is implemented using hardware components so that the low pass filter and flight computer comprise different components or parts. Alternatively, the low pass filter may be implemented in software (e.g., the low pass filter is part of the flight computer).

The following figure describes this example more generally and/or formally in a flowchart.

Figure 9:
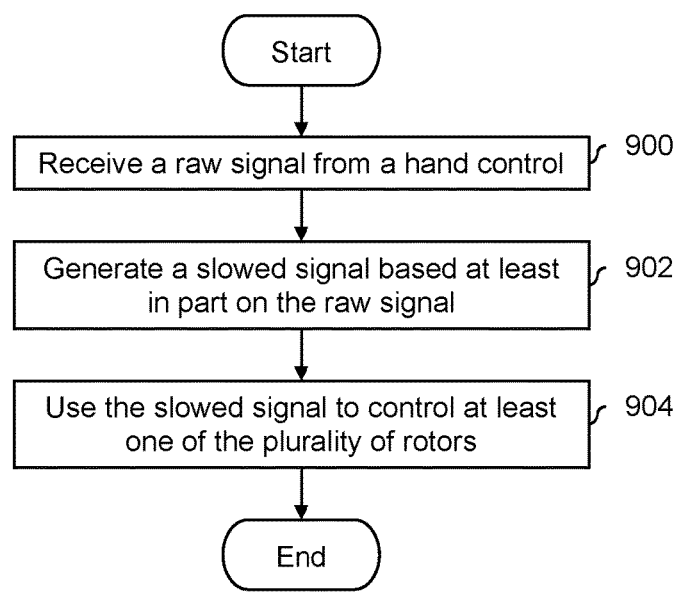
FIG. 9 is a flowchart illustrating an embodiment of a process to have a slowed velocity response in response to a hand control signal changing suddenly.

FIG. 9 is a flowchart illustrating an embodiment of a process to have a slowed velocity response in response to a hand control signal changing suddenly. In some embodiments, the process is performed using a flight computer and/or a low pass filter. In some embodiments, the process is performed in combination with one or more other processes described herein. In some embodiments, the process is used in combination with the hand controls shown in FIG. 3-5B; alternatively, this process may be used in combination with some other hand controls.

At 900, a raw signal is received from a hand control. For example, the hand control signal may be a single axis thumbwheel (see, e.g., FIG. 4) or a three axis fingertip joystick (see, e.g., FIG. 5A and FIG. 5B).

At 902, a slowed signal is generated based at least in part on the raw signal. For example, in diagram 800 in FIG. 8, the slowed signal (806) is basically the raw signal (804) slowed down so that the sudden change (802) occurs over a longer period of time (i.e., the two signals start and end at the same thumbwheel displacement or position). In diagram 840, the slowed signal is generated by passing the raw signal into a low pass filter.

At 904, the slowed signal is used to control at least one of the plurality of rotors. For example, in diagram 840 in FIG. 8, the slowed signal is passed to a flight computer (846) which generates control signals (not shown) which are passed to rotor controllers and/or rotor motors. For example, in FIG. 1 and FIG. 2, ten control signals would be generated for the ten rotors.

Figure 10:
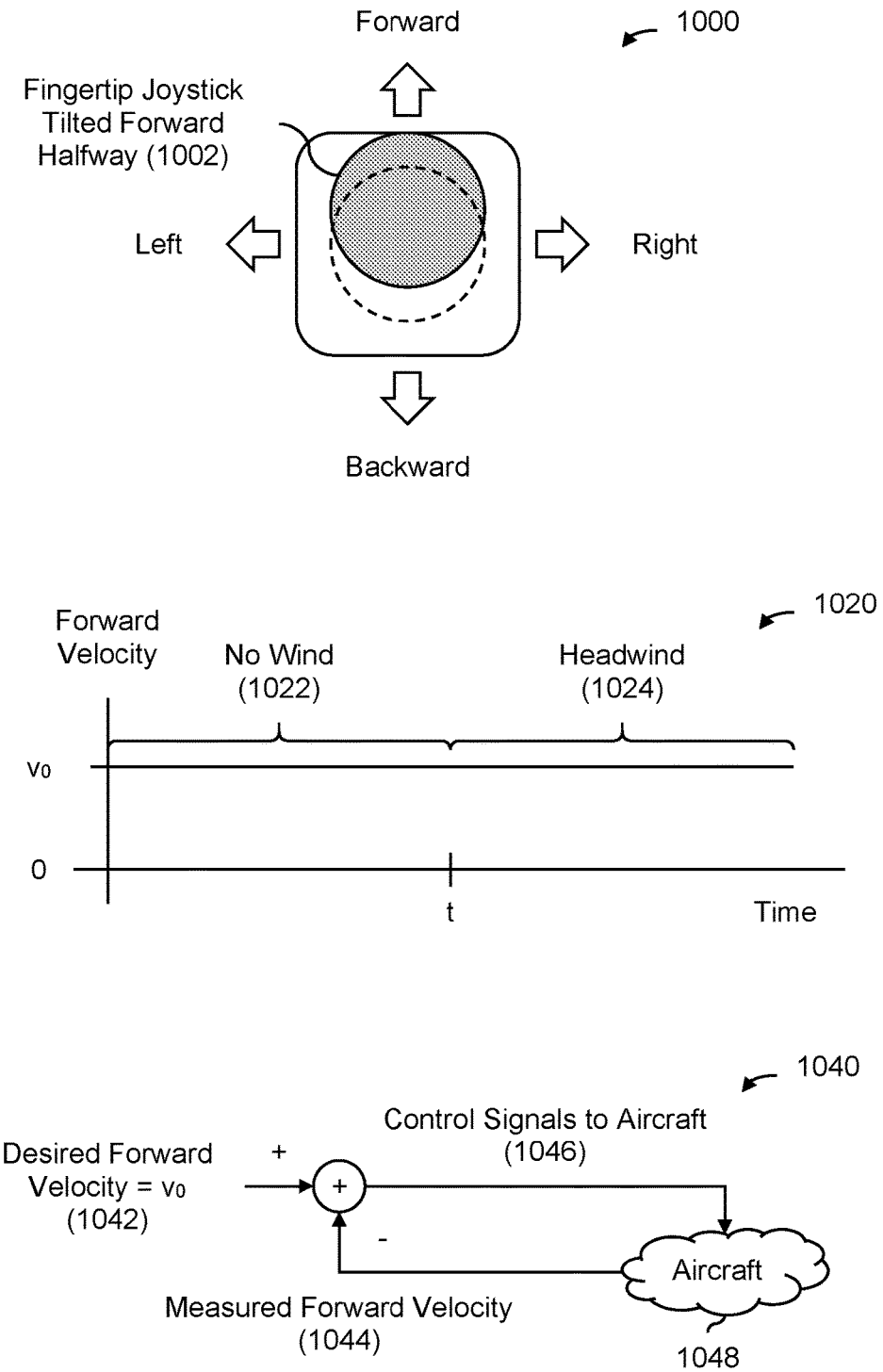
FIG. 10 is a diagram illustrating an embodiment of a consistent velocity response.

FIG. 10 is a diagram illustrating an embodiment of a consistent velocity response. Diagram 1000 shows a top view of a fingertip joystick (1002) which is tilted forward halfway. In this example, the fingertip joystick is held in this position and the pilot is not touching the thumbwheel (e.g., so that the multicopter maintains a constant altitude).

Diagram 1020 shows a graph where the x-axis is time and the y-axis is the forward velocity of the multicopter where the multicopter's fingertip joystick is held forward in the position shown in diagram 1000. During a first period of time (1022), there is no wind and the multicopter flies forward at some velocity $v_0$. During a second period of time (1024), the multicopter encounters substantial headwind. In this example, the flight computer will compensate for this environmental change (in this example, the headwind) so that the multicopter provides a consistent velocity response for the (e.g., same) position of the hand control, which in this example is the fingertip joystick being pushed forward halfway. This gives the pilot a more consistent flight experience, independent of environmental conditions such as wind. If the pilot were to fly the aircraft again, (s)he would know that pushing the fingertip joystick forward halfway will result in a forward velocity of $v_0$. People tend to not like large amounts of uncertainty, especially in unfamiliar situations, and so a more consistent flight experience may result in a more pleasant and relaxed flight experience for inexperienced and/or infrequent pilots.

Diagram 1040 shows an example of how a flight computer may maintain a consistent forward velocity (or, more generally, flight experience). In this example, a (negative) feedback loop is used where the difference between the desired forward velocity (1042) and measured forward velocity (1044) is obtained. For example, the desired forward velocity may be determined or otherwise calculated from the fingertip joystick position shown in diagram 1000 and the latter may be obtained using the aircraft's GPS. This difference is then used to set or otherwise adjust the control signals to the aircraft (1046). To use FIG. 1 as an example, the control signals would be passed to the ten rotors shown there to output more thrust to compensate for the headwind. This change in the control signals affects the aircraft (1048) and subsequently the measured forward velocity (1044). If the pilot's input via the fingertip joystick changes, then the desired forward velocity (1042) may be updated.

The following figure describes this more generally and/or formally in a flowchart.

Figure 11:
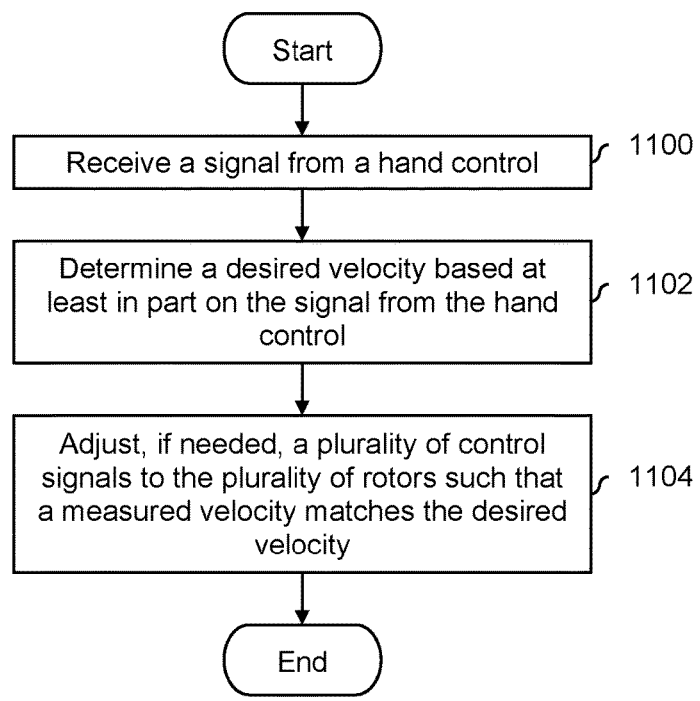
FIG. 11 is a flowchart illustrating an embodiment of a process to have a consistent velocity response.

FIG. 11 is a flowchart illustrating an embodiment of a process to have a consistent velocity response. In some embodiments, the process is performed by a flight computer. In some embodiments, the process is performed in combination with one or more other processes described herein. In some embodiments, the process is used in combination with the hand controls shown in FIG. 3-5B; alternatively, this process may be used in combination with some other hand controls.

At 1100, a signal is received from a hand control. For example, the signal may be received from a single axis thumbwheel (see, e.g., FIG. 4) or a three axis fingertip joystick (see, e.g., FIG. 5A and FIG. 5B).

At 1102, a desired velocity is determined based at least in part on the hand control signal. For example, for a hand control signal from a single axis thumbwheel, the desired velocity may directly relate to the value of the signal and/or the displacement of the thumbwheel. For hand control information from a three axis fingertip joystick, a linear desired velocity (e.g., within an x-y plane) may be based on an x (roll) signal and/or a y (pitch) signal. A desired angular velocity (e.g., about a vertical or yaw axis) may be based on a z (yaw) signal.

At 1104, a plurality of control signals to the plurality of rotors is adjusted, if needed, such that a measured velocity matches the desired velocity. For example, in diagram 1040 in FIG. 10, a (negative) feedback loop is used.

In some embodiments, the system (e.g., the flight controller) calculates a pitch offset which varies or is otherwise based on forward velocity. The following figures describe an example of this.

Figure 12:
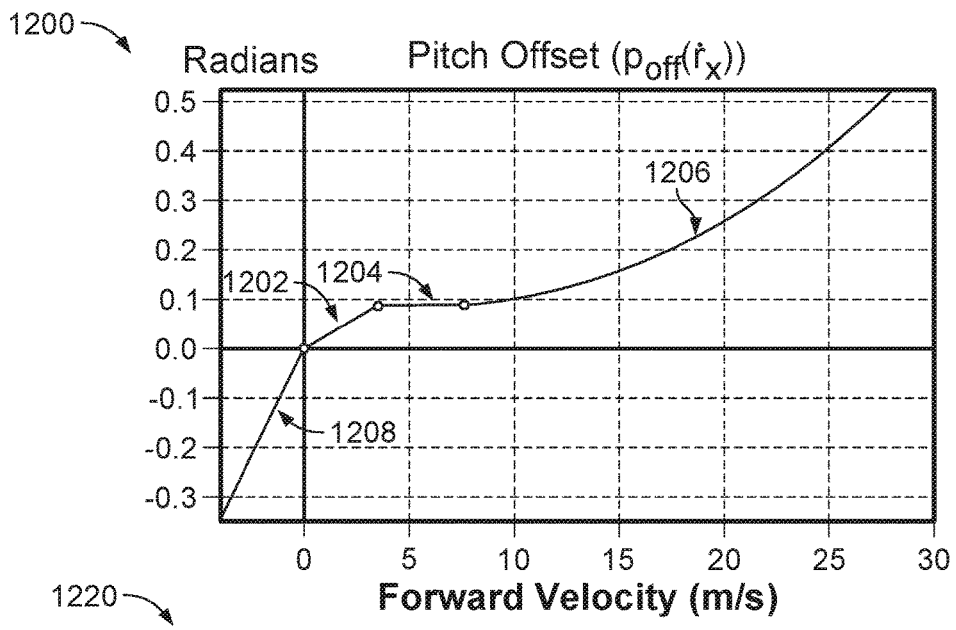
FIG. 12 is a diagram illustrating an embodiment of a pitch angle which is adjusted using a pitch angle offset which is based at least in part on forward velocity.
Figure 12:
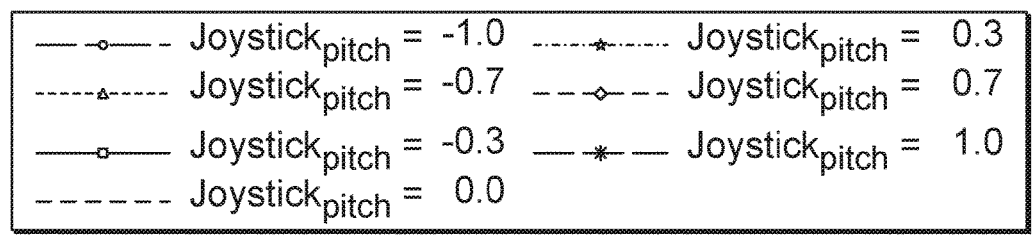
Figure 12:
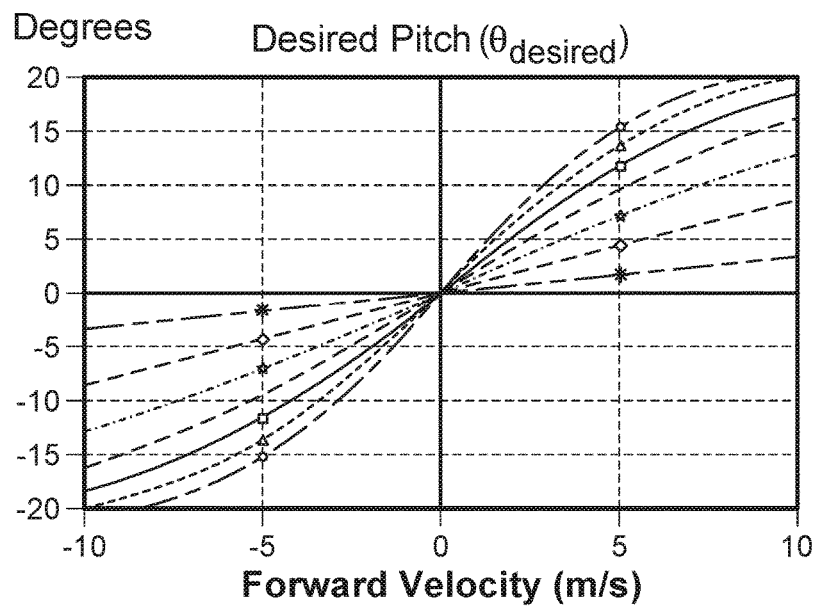

FIG. 12 is a diagram illustrating an embodiment of a pitch angle which is adjusted using a pitch angle offset which is based at least in part on forward velocity. In some embodiments, this technique is referred to as attitude shaping. In this example, a flight controller or flight computer (not shown) receives or otherwise inputs desired altitudes and runs a feedback loop based on those desired altitudes. This total (e.g., because it is a sum) or desired (e.g., because it is used in this example in a feedback loop) pitch ($\theta_{desired}$) is given by:

$$\theta_{desired} = \text{joystick}_{pitch} + p_{off}(\dot{r}_x)$$

where $\text{joystick}_{pitch}$ is the pitch specified via a joystick and $p_{off}(\dot{r}_x)$ is the pitch offset which is a function of (i.e., is based at least in part on) the forward velocity ($\dot{r}_x$). The two summands in the sum are independent of each other (e.g., so that the first term does not affect or otherwise change the value of the second term and vice versa). In this example, the pitch offset ($p_{off}(\dot{r}_x)$) is given by:

$$p_{off}(\dot{r}_x) = p_{default\_off} \times \frac{\dot{r}_x}{\dot{r}_x^{low}} \quad \text{when } 0.0 \le \dot{r}_x < \dot{r}_x^{low};$$

$$p_{off}(\dot{r}_x) = p_{default\_off} \quad \text{when } \dot{r}_x^{low} \le \dot{r}_x \le \dot{r}_x^{start};$$

$$p_{off}(\dot{r}_x) = p_{default\_off} + 300° \times \left(\frac{\dot{r}_x - \dot{r}_x^{start}}{\dot{r}_x^{end} - \dot{r}_x^{start}}\right)^2 \quad \text{when } \dot{r}_x > \dot{r}_x^{start}; \text{ and}$$

$$p_{off}(\dot{r}_x) = p_{default\_off} \times \dot{r}_x \quad \text{when } \dot{r}_x < 0.0$$

where $p_{default\_off} = 5°$, $\dot{r}_x^{low} = 2.5$, $\dot{r}_x^{start} = 3.5$, and $\dot{r}_x^{end} = 25.0$ in this example. A negative pitch offset (i.e., $p_{off}(\dot{r}_x) < 0$) will cause the aircraft to tilt forward from whatever pitch angle is specified via the joystick (i.e., $\text{joystick}_{pitch}$). Conversely, a positive pitch offset (i.e., $p_{off}(\dot{r}_x) > 0$) would cause the aircraft to tilt backwards from whatever pitch angle is specified via the joystick.

It is noted that the example equations shown here correspond to the multicopter shown in FIG. 1 and FIG. 2 and the hand controls shown in FIGS. 3-5B. Other types of aircraft and/or hand controls may result in other equations.

Diagram 1200 shows a graph of the pitch offset. In this graph, the x-axis corresponds to forward velocity and the y-axis shows the corresponding pitch offset that would be calculated from the piecewise function above. Dots in the graph indicate a transition from one sub-function to another sub-function.

The pitch offset's first sub-function in the piecewise equation above (e.g., when the aircraft is flying forwards and $0.0 \leq \dot{r}_x < \dot{r}_x^{low}$) is shown as segment 1202 and is associated with a relatively small amount of pitch offset (e.g., on the order of 0-5 degrees). For example, suppose the aircraft is hovering at a constant position without moving in any direction. While the aircraft is hovering and the forward velocity is 0 (i.e., $\dot{r}_x=0$), the pitch offset is also 0 (i.e., $p_{off}(\dot{r}_x)=0$). This is sensible and/or attractive because when the aircraft is hovering at a constant position, the natural or desired position would be for the aircraft to be level, which corresponds to a joystick-specified pitch angle of 0, a pitch offset of 0, and a desired pitch of 0.

The pitch offset's second sub-function (i.e., when $\dot{r}_x^{low} \leq \dot{r}_x \leq \dot{r}_x^{start}$) is shown as segment 1204 where a moderate amount of pitch offset is added (in this example, a fixed pitch offset of ~5 degrees). In some embodiments, this forward velocity range is associated with a "cruising" velocity, for example, where the aircraft is expected to operate once takeoff has been performed and ground-level obstacles have been cleared. In this example, this forward velocity range is where the forward velocity is associated with a moderate amount of risk and/or danger, and correspondingly where only a moderate degree or amount of intervention is performed.

The third sub-function associated with the pitch offset (i.e., when $\dot{r}_x > \dot{r}_x^{start}$) is shown as segment 1206. In this region, the forward velocity range is associated with a relatively high amount of risk and/or danger and strong or forceful intervention is desired. As such, not only is the magnitude of the pitch offset the largest here, but the pitch offset ramps up much more quickly in this region compared to other regions (e.g., the first derivative of $p_{off}(\dot{r}_x)$ in region 1202 is less than the first derivative of $p_{off}(\dot{r}_x)$ in region 1206).

The fourth sub-function associated with the pitch offset (i.e., when $\dot{r}_x < 0.0$) is shown as segment 1208 and corresponds to when the aircraft is flying backwards. As before, the pitch offset acts to put the aircraft into a more level position as the magnitude of the velocity increases, except in this range the signs are reversed from the regions and sub-functions described (e.g., the pitch offset is negative here, not positive, and the pitch angle specified via the joystick is positive here, not negative).

Diagram 1220 shows the desired pitch ($\theta_{desired}$) for various pitch angles specified or input via a joystick (joystick$_{pitch}$). For example, these values would be used in a control loop.

Generally speaking, as the magnitude of the multicopter's velocity increases, the magnitude of the pitch offset increases. Note, for example, that the $p_{off}(\dot{r}_x)$ function never decreases as the forward velocity increases (i.e., it monotonically increases). This causes the aircraft to tilt backward more and more from the pitch angle specified via the joystick as the forward velocity increases.

A benefit to this adjustment is that for a multicopter where all of the rotors rotate in a substantially horizontal plane (see FIG. 1 and FIG. 2), the adjustment by the pitch offset will act to drive down the forward velocity to 0 much faster than would otherwise occur without the pitch offset as the multicopter flies forward faster and faster. By putting the multicopter into are more level and/or horizontal position because of the pitch offset, the rotors of the multicopter will similarly be put into a more level or horizontal position. This, in turn, acts to slow down the multicopter, because the airflow from the rotors pushes backwards less and less and downwards more and more which in turn causes the multicopter to slow down. To put it another way, the pitch offset puts the rotors of the multicopter into a position which is less efficient or effective for forward flight, and so as the forward velocity increases, the magnitude of the pitch offset will also increase, and the multicopter will increasingly level out and increasingly slow down.

Thus, determining and applying a pitch offset is desirable because it acts to drive down the forward velocity to 0 much faster than if no pitch offset were used. To put it another way, using a pitch offset applies a physical limit on the top speed of the multicopter by increasingly orienting the rotors in a way that sends less of the airflow backwards as forward velocity increases. This makes flying the aircraft safer since it limits the maximum velocity of the aircraft.

This example is described more generally and/or formally in a flowchart below.

Figure 13:
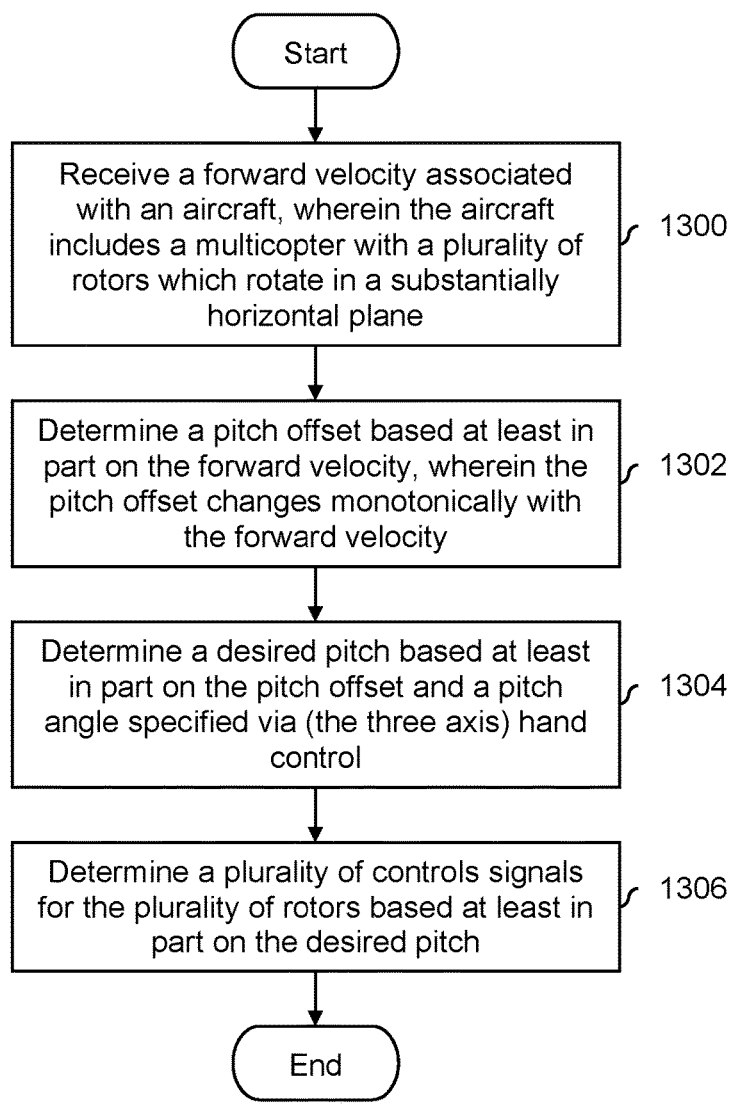
FIG. 13 is a flowchart illustrating an embodiment of a process to adjust a pitch angle using an offset which is based at least in part on forward velocity.

FIG. 13 is a flowchart illustrating an embodiment of a process to adjust a pitch angle using an offset which is based at least in part on forward velocity. In some embodiments, the process is performed by a flight computer. In some embodiments, the process is performed in combination with one or more other processes described herein. In some embodiments, the process is used in combination with the hand controls shown in FIG. 3-5B; alternatively, this process may be used in combination with some other hand controls.

At 1300, a forward velocity associated with an aircraft is received, wherein the aircraft includes a multicopter with a plurality of rotors which rotate in a substantially horizontal plane. For example, FIG. 1 and FIG. 2 show one such multicopter. In some embodiments, a substantially horizontal plane (e.g., in which the rotors rotate) is within a range of ±10° (see, for example, Table 2 where the roll and pitch angles all have magnitudes less than 10°).

At 1302, a pitch offset is determined based at least in part on the forward velocity, wherein the pitch offset changes monotonically with the forward velocity. See, for example, the graph of $p_{off}(\dot{r}_x)$ shown in FIG. 12 and the associated piecewise function described above. As shown in FIG. 12 at 1200, going from left to right, $p_{off}(\dot{r}_x)$ function 1202 either stays the same or increases when as $\dot{r}_x$.

At 1304, a desired pitch is determined based at least in part on the pitch offset and a pitch angle specified via (the three axis) hand control. In the example equations above, $\theta_{desired}$=joystick$_{pitch}$+$p_{off}(\dot{r}_x)$ where the opposite signs (e.g., positive versus negative) of joystick$_{pitch}$ and $p_{off}(\dot{r}_x)$ mean that the pitch offset acts as a counter to the pitch angle specified via the hand control (e.g., the offset acts to put the multicopter at a more level pitch angle).

At 1306, a plurality of control signals is determined for the plurality of rotors based at least in part on the desired pitch. For example, the control signals to the rotors may be adjusted (e.g., using a feedback loop) in order to fly the aircraft at the desired pitch. As described above, the pitch offset causes the multicopter to level off and thus slow down as the magnitude of the forward velocity (e.g., going forward or backward) gets larger. See, for example, diagram 1240 where the airflow from the rotors is directed more downward and less backward because of the pitch offset which slows the aircraft down.

Similarly, in some embodiments, the system (e.g., the flight controller) adjusts a yaw rate by calculating a yaw rate offset and applying it to a yaw rate that is specified via the hand controls. The following figures describe an example of this.

Figure 14:
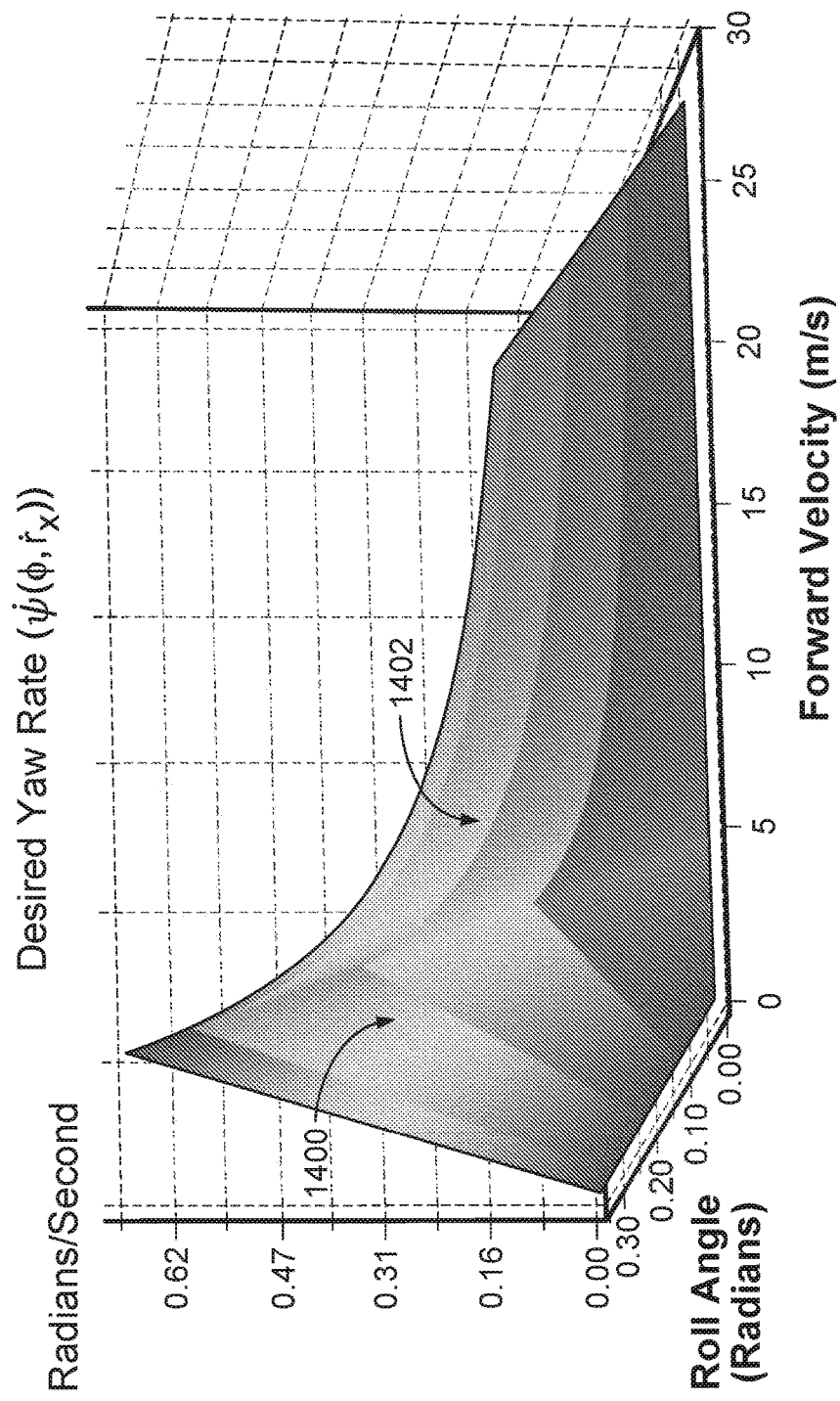
FIG. 14 is a diagram illustrating an embodiment of a yaw rate which is adjusted using an offset which is based at least in part on roll angle and forward velocity.

FIG. 14 is a diagram illustrating an embodiment of a yaw rate which is adjusted using an offset which is based at least in part on roll angle and forward velocity. In some embodiments, this technique is referred to as turn coordination blending. In this example, the yaw rate specified via a joystick without adjustment produces a less-than-optimal and/or unsatisfying flight experience, especially when turning and flying forward at various forward velocities. For this reason, a yaw rate offset is calculated and used to adjust the yaw rate specified via the joystick. From the pilot's perspective, the yaw rate with the adjustment or offset better orients the pilot in the direction of motion so that the pilot is better facing the same direction of motion as the multicopter is turning toward. From a performance point of view, the yaw rate with the adjustment or offset puts the rotors of the multicopter in a better orientation for the turn (e.g., the airflow is more parallel with the direction of motion) so that the turn can be performed more efficiently and power can be conserved. This requires some adjustment to the yaw rate that is specified via the joystick (or, more generally, the hand control(s)).

In this example, this total (e.g., because it is a sum) or desired (e.g., because it is used in this example at least in a feedback loop) yaw rate ($\dot{\psi}(\phi, \dot{r}_x)$) is in radians per second and is generally given by:

$$\dot{\psi}(\phi, \dot{r}_x) = \text{joystick}_{yaw} + y_{off}(\phi, \dot{r}_x)$$

where joystick$_{yaw}$ is the yaw rate specified via the joystick, $y_{off}(\phi, \dot{r}_x)$ is the yaw rate offset which is a function of $\phi$ and $\dot{r}_x$, $\phi$ is the roll angle of the aircraft (e.g., actual roll angle, desired roll angle, etc.), and $\dot{r}_x$ is the forward velocity. More specifically, it is given by:

$$\dot{\psi}(\phi, \dot{r}_x) = \text{joystick}_{yaw} + \frac{9.81\tan(\phi)}{\dot{r}_x} \times \left(\frac{\dot{r}_x}{\dot{r}_x^{coord}}\right)^2 \quad \text{when } 0.0 < |\dot{r}_x| \le \dot{r}_x^{coord};$$

and $$\dot{\psi}(\phi, \dot{r}_x) = \text{joystick}_{yaw} + \frac{9.81\tan(\phi)}{\dot{r}_x} \quad \text{when } |\dot{r}_x| > \dot{r}_x^{coord}$$

where $\dot{r}_x^{coord}$ acts as a threshold or region/range boundary and in this example is 5.0. It is noted that two summands in the equations above are independent, so changing the yaw rate specified via the joystick would merely shift the surface shown here up or down. To put it another way, the shape of the surface shown here also indicates how the yaw rate offset changes (generally speaking) as a function of the roll angle and forward velocity.

It is noted that the example equations shown here correspond to the multicopter shown in FIG. 1 and FIG. 2 and the hand controls shown in FIGS. 3-5B. Other types of aircraft and/or hand controls may result in other equations.

An example total yaw rate (e.g., for a joystick$_{yaw}$=0) is graphed in this figure. When the forward velocity is in the first range (i.e., $0.0 < |\dot{r}_x| \le \dot{r}_x^{coord}$), the yaw rate offset (which follows the same general shape shown here) will increase for a given roll angle as forward velocity increases. Note, for example, the positive gradient of surface 1400 and that in the equations above, $$\frac{9.81\tan(\phi)}{\dot{r}_x} \times \left(\frac{\dot{r}_x}{\dot{r}_x^{coord}}\right)^2$$

simplifies to a term which is proportional to $\dot{r}_x$.

In this region or range (i.e., corresponding to surface 1400, when $0.0 < |\dot{r}_x| \le \dot{r}_x^{coord}$) the yaw rate offset is positive which acts to rotate the multicopter about the yaw or vertical axis in a clockwise direction looking down on the aircraft (e.g., a negative yaw rate would cause the multicopter to rotate in a counterclockwise direction). In surface 1400, only positive roll angle values are shown, which means that the aircraft is at a roll angle where its right or starboard wing tipped down and its left or port wing tipped up and the yaw rate offset acts to further (e.g., to use a driving analogy) steer or otherwise turn (e.g., more) into the turn. This adjustment introduced by the yaw rate offset is helpful in this region because at low speeds (that is, at forward velocities between 0.0 and $\dot{r}_x^{coord}$) relatively little offset is required. If the equation for the offset used in the greater than $\dot{r}_x^{coord}$ region were used in this region, then the offset would increase as forward velocity approached zero (which is undesirable because when at or near a forward velocity of zero, there should be little or no yaw (offset). Rather, the yaw rate offset should decrease as forward velocity approaches zero.

For forward velocities beyond $\dot{r}_x^{coord}$, the desired yaw rate and yaw rate offset begin to decrease. Note, for example, the negative gradient associated with surface 1402 and that the term $$\frac{9.81\tan(\phi)}{\dot{r}_x}$$

in the equations above will approach 0 as $\dot{r}_x$ increases. This relationship strictly follows the yaw rate required for an ideal turn (e.g., to follow a desired curve, as opposed to laterally deviating from the desired curve). In other words, for forward velocities greater than $\dot{r}_x^{coord}$ the yaw rate offset will equal the yaw rate required to maintain coordinated flight (i.e., follow a desired curve).

It is noted that the yaw rate offset in the equations above (that is, the second term in the summations above) produces a yaw rate that equals that which is required to follow an ideal or desired turn or curve. That is, the yaw rate offset in the equations above assumes that the yaw rate specified via the joystick is zero (note, for example, that the yaw rate offset does not take into account the yaw rate specified via the joystick and therefore does not compensate for any non-zero value coming in from the joystick). This permits novice pilots to fly the aircraft without having to specify a yaw rate (i.e., it equals zero), while also permitting more experienced and/or adventurous pilots to specify some non-zero yaw rate input (e.g., to make the flying experience more exciting). For example, a more experienced and/or adventurous pilot may want to add some lateral deviation while turning (e.g., like drifting in driving) and they can do this by adding some non-zero yaw rate via the joystick.

This example is described more generally and/or formally in the flow chart below.

Figure 15:
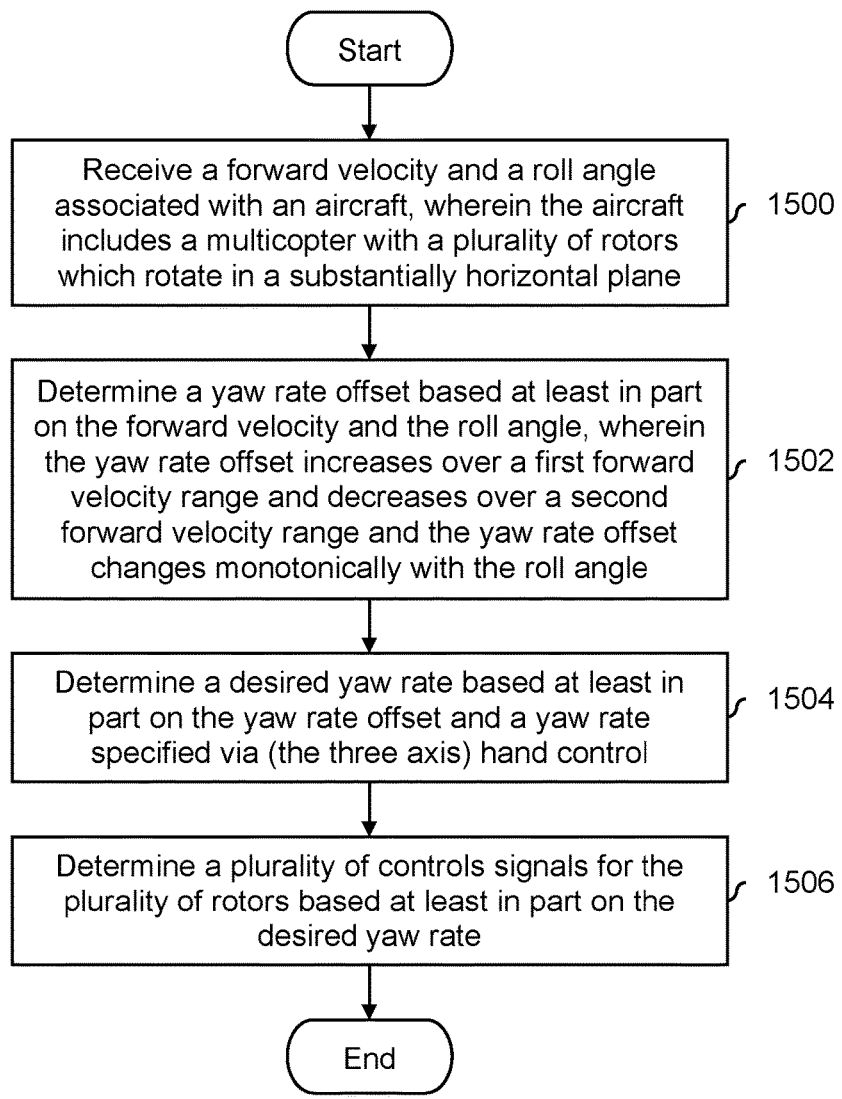
FIG. 15 is a flowchart illustrating an embodiment of a process to adjust a yaw rate using a yaw rate offset which is based at least in part on a roll angle and a forward velocity.

FIG. 15 is a flowchart illustrating an embodiment of a process to adjust a yaw rate using a yaw rate offset which is based at least in part on a roll angle and a forward velocity. In some embodiments, the process is performed by a flight computer. In some embodiments, the process is performed in combination with one or more other processes described herein. In some embodiments, the process is used in combination with the hand controls shown in FIG. 3-5B; alternatively, this process may be used in combination with some other hand controls.

At 1500, a forward velocity and a roll angle associated with an aircraft are received, wherein the aircraft includes a multicopter with a plurality of rotors which rotate in a substantially horizontal plane. See, for example, FIG. 1 and FIG. 2 for an example aircraft.

At 1502, a yaw rate offset is determined based at least in part on the forward velocity and the roll angle, wherein the yaw rate offset increases over a first forward velocity range and decreases over a second forward velocity range and the yaw rate offset changes monotonically with the roll angle. See, for example, FIG. 14, where the yaw rate offset (which follows the shape of the curve shown in FIG. 14) increases in region 1400 but decreases in region 1402. That graph also shows that the yaw rate offset monotonically increases as the roll angle increases. See also the example equations above for $y_{off}(\phi, \dot{r}_x)$.

At 1504, a desired yaw rate is determined based at least in part on the yaw rate offset and a yaw rate specified via (the three axis) hand control. In FIG. 5B, for example, the pilot may specify a yaw rate by twisting knob 540. This specified yaw rate may be added to the yaw rate offset, as described in the example equations above.

At 1506, a plurality of control signals is determined for the plurality of rotors based at least in part on the desired yaw rate. For example, ten control signals may be generated for the ten rotors shown in FIG. 1 and FIG. 2, where the control signals try to adjust the yaw rate of the multicopter (e.g., via or using the yaw rate offset) in order to put the multicopter in a position during a turn that is more satisfying for the pilot and/or more aerodynamically efficient for the turn.

It is noted that in the above examples, the yaw rate is the thing that is adjusted or otherwise determined using an offset. In some embodiments, the roll angle is the thing adjusted or determined. For example, for aircraft with different geometries (e.g., a different arrangements of rotors) and/or with different hand controls, the roll angle which is specified via the hand control(s) without adjustment produces an unsatisfying and/or less-than-optimal flight experience. In some embodiments, a roll angle offset is determined using a yaw rate and this roll angle offset is used to adjust a roll angle which is specified via the hand control(s). The above equations and processes may be rewritten or otherwise rearranged so that the yaw rate is the input and the roll angle(s) are the output. For example, the above equations could be rewritten so that:

$$\phi(\dot{\psi}, \dot{r}_x) = joystick_{roll} + r_{off}(\dot{\psi}, \dot{r}_x)$$

where $\phi(\dot{\psi}, \dot{r}_x)$ is the total or desired roll angle, $joystick_{roll}$ is the roll angle that is specified via some hand control(s), and $r_{off}(\dot{\psi}, \dot{r}_x)$ is the roll angle offset which is a function of $\dot{\psi}$ (i.e., yaw rate) and $\dot{r}_x$ (i.e., forward velocity). This may still be referred to as turn coordination blending (e.g., it is still applicable to turns and has the same benefits during turning described above), but is done with different inputs and outputs compared to above. As with the equations for the yaw rate, the joystick roll may be zero (e.g., for novice pilots) or non-zero (e.g., for experienced and/or more adventurous pilots). This process of determining and applying a roll angle offset is described more formally in the following flowchart.

Figure 16:
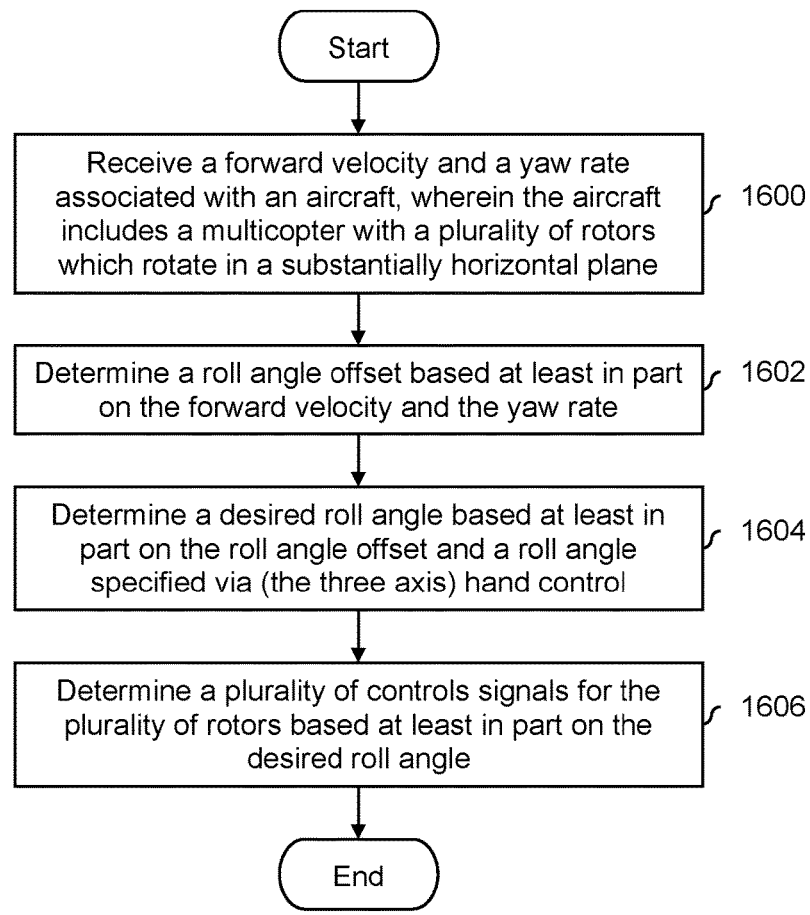
FIG. 16 is a flowchart illustrating an embodiment of a process to adjust a roll angle using a roll angle offset which is based at least in part on a yaw rate and a forward velocity.

FIG. 16 is a flowchart illustrating an embodiment of a process to adjust a roll angle using a roll angle offset which is based at least in part on a yaw rate and a forward velocity. In some embodiments, the process is performed by a flight computer. In some embodiments, the process is performed in combination with one or more other processes described herein. In some embodiments, the process is used in combination with the hand controls shown in FIG. 3-5B; alternatively, this process may be used in combination with some other hand controls.

At 1600, a forward velocity and a yaw rate associated with an aircraft are received, wherein the aircraft includes a multicopter with a plurality of rotors which rotate in a substantially horizontal plane.

At 1602, a roll angle offset is determined based at least in part on the forward velocity and the yaw rate.

At 1604, a desired roll angle is determined based at least in part on the roll angle offset and a roll angle specified via (the three axis) hand control.

At 1606, a plurality of control signals is determined for the plurality of rotors based at least in part on the desired roll angle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a single axis hand control which is configured to control movement of an aircraft along a vertical axis, wherein:
        the single axis hand control includes a thumbwheel which is attached to a left handgrip;
        the aircraft includes a plurality of rotors that are attached to the aircraft at a fixed position; and
        the plurality of rotors rotate independently of one another; and
    a three axis hand control which is configured to control movement of the aircraft within a plane defined by a roll axis and a pitch axis, as well as about a yaw axis, wherein the three axis hand control includes a fingertip joystick which is attached to a right armrest.

2. The system recited in claim 1, wherein:
    the single axis hand control includes a thumbwheel; and
    the three axis hand control includes a fingertip joystick.

3. The system recited in claim 1, wherein:
    the single axis hand control includes a thumbwheel which in turn includes:
        a tab with a height in a range of 0.125 inch-1 inch; and
        a faceplate with a height in a range of 0.5 inch-2 inches and a width in a range of 0.25 inch-1 inch.

4. The system recited in claim 1 further comprising a flight controller which is configured to:
    receive an altitude associated with the aircraft; and
    set a maximum velocity associated with the aircraft based at least in part on the altitude.

5. The system recited in claim 1 further comprising:
    a low pass filter which is configured to:
        receive a raw signal from a hand control; and
        generate a slowed signal based at least in part on the raw signal; and
    a flight controller which is configured to use the slowed signal to control at least one of the plurality of rotors.

6. The system recited in claim 1 further comprising a flight controller which is configured to:
    receive a signal from a hand control;
    determine a desired velocity based at least in part on the signal from the hand control; and
    adjust, if needed, a plurality of control signals to the plurality of rotors such that a measured velocity matches the desired velocity.

7. The system recited in claim 1 further comprising a flight controller which is configured to:

receive a forward velocity associated with the aircraft, wherein the aircraft includes a multicopter with a plurality of rotors which rotate in a substantially horizontal plane;

determine a pitch offset based at least in part on the forward velocity, wherein the pitch offset changes monotonically with the forward velocity;

determine a desired pitch based at least in part on the pitch offset and a pitch angle specified via the three axis hand control; and determine a plurality of control signals for the plurality of rotors based at least in part on the desired pitch.

8. The system recited in claim 1, wherein:

the system further comprises a flight controller which is configured to:

receive a forward velocity associated with the aircraft, wherein the aircraft includes a multicopter with a plurality of rotors which rotate in a substantially horizontal plane;

determine a pitch offset based at least in part on the forward velocity, wherein the pitch offset changes monotonically with the forward velocity;

determine a desired pitch based at least in part on the pitch offset and a pitch angle specified via the three axis hand control; and determine a plurality of control signals for the plurality of rotors based at least in part on the desired pitch; and determining the desired pitch includes summing the pitch offset and the pitch angle specified via the three axis hand control, wherein the pitch angle specified via the three axis hand control is non-zero.

9. The system recited in claim 1 further comprising a flight controller which is configured to:

receive a forward velocity and a roll angle associated with the aircraft, wherein the aircraft includes a multicopter with a plurality of rotors which rotate in a substantially horizontal plane;

determine a yaw rate offset based at least in part on the forward velocity and the roll angle, wherein the yaw rate offset increases over a first forward velocity range and decreases over a second forward velocity range and the yaw rate offset changes monotonically with the roll angle;

determine a desired yaw rate based at least in part on the yaw rate offset and a yaw rate specified via the three axis hand control; and determine a plurality of control signals for the plurality of rotors based at least in part on the desired yaw rate.

10. The system recited in claim 1, wherein:

the system further comprises a flight controller which is configured to:

receive a forward velocity and a roll angle associated with the aircraft, wherein the aircraft includes a multicopter with a plurality of rotors which rotate in a substantially horizontal plane;

determine a yaw rate offset based at least in part on the forward velocity and the roll angle, wherein the yaw rate offset increases over a first forward velocity range and decreases over a second forward velocity range and the yaw rate offset changes monotonically with the roll angle;

determine a desired yaw rate based at least in part on the yaw rate offset and a yaw rate specified via the three axis hand control; and determine a plurality of control signals for the plurality of rotors based at least in part on the desired yaw rate; and determining the desired yaw rate includes summing the yaw rate offset and the yaw rate specified via the three axis hand control, wherein the yaw rate specified via the three axis hand control is non-zero.

11. The system recited in claim 1 further comprising a flight controller which is configured to:

receive a forward velocity and a yaw rate associated with the aircraft, wherein the aircraft includes a multicopter with a plurality of rotors which rotate in a substantially horizontal plane;

determine a roll angle offset based at least in part on the forward velocity and the yaw rate;

determine a desired roll angle based at least in part on the roll angle offset and a roll angle specified via the three axis hand control; and determine a plurality of control signals for the plurality of rotors based at least in part on the desired roll angle.

12. The system recited in claim 1, wherein:

the system further comprises a flight controller which is configured to:

receive a forward velocity and a yaw rate associated with the aircraft, wherein the aircraft includes a multicopter with a plurality of rotors which rotate in a substantially horizontal plane;

determine a roll angle offset based at least in part on the forward velocity and the yaw rate;

determine a desired roll angle based at least in part on the roll angle offset and a roll angle specified via the three axis hand control; and determine a plurality of control signals for the plurality of rotors based at least in part on the desired roll angle; and determining the desired roll angle includes summing the roll angle offset and the roll angle specified via the three axis hand control, wherein the roll angle specified via the three axis hand control is non-zero.

13. A method, comprising:

receiving a forward velocity associated with an aircraft, wherein the aircraft includes a multicopter with a plurality of rotors which rotate in a substantially horizontal plane;

determining a pitch offset based at least in part on the forward velocity, wherein the pitch offset changes monotonically with the forward velocity;

determining a desired pitch based at least in part on the pitch offset and a pitch angle specified via a three-axis hand control, wherein:

the three-axis hand control is configured to control movement of the aircraft within a plane defined by a roll axis and a pitch axis as well as about a yaw axis;

the three-axis hand control includes a fingertip joystick which is attached to a right armrest; and determine a plurality of control signals for the plurality of rotors based at least in part on the desired pitch and desired movement along a vertical axis, wherein the movement along the vertical axis is indicated by input received from a single-axis hand control, the single-axis hand control including a thumbwheel which is attached to a left handgrip.

14. The method recited in claim 13, wherein determining the desired pitch includes summing the pitch offset and the pitch angle specified via the three-axis hand control, wherein the pitch angle specified via the three-axis hand control is non-zero.

15. A method, comprising:
receiving a forward velocity and a roll angle associated with an aircraft, wherein the aircraft includes a multicopter with a plurality of rotors which rotate in a substantially horizontal plane;
determining a yaw rate offset based at least in part on the forward velocity and the roll angle, wherein the yaw rate offset increases over a first forward velocity range and decreases over a second forward velocity range and the yaw rate offset changes monotonically with the roll angle;
determining a desired yaw rate based at least in part on the yaw rate offset and a yaw rate specified via a three-axis hand control, wherein:
the three-axis hand control is configured to control movement of the aircraft within a plane defined by a roll axis and a pitch axis as well as about a yaw axis;
the three-axis hand control includes a fingertip joystick which is attached to a right armrest; and
determining a plurality of control signals for the plurality of rotors based at least in part on the desired yaw rate and desired movement along a vertical axis, wherein the movement along the vertical axis is indicated by input received from a single-axis hand control, the single-axis hand control including a thumbwheel which is attached to a left handgrip.

16. The method recited in claim 15, wherein determining the desired yaw rate includes summing the yaw rate offset and the yaw rate specified via the three-axis hand control, wherein the yaw rate specified via the three-axis hand control is non-zero.

17. A method, comprising:
receiving a forward velocity and a yaw rate associated with an aircraft, wherein the aircraft includes a multicopter with a plurality of rotors which rotate in a substantially horizontal plane;
determining a roll angle offset based at least in part on the forward velocity and the yaw rate;
determining a desired roll angle based at least in part on the roll angle offset and a roll angle specified via a three-axis hand control, wherein:
the three-axis hand control is configured to control movement of the aircraft within a plane defined by a roll axis and a pitch axis as well as about a yaw axis;
the three-axis hand control includes a fingertip joystick which is attached to a right armrest; and
determining a plurality of control signals for the plurality of rotors based at least in part on the desired roll angle and desired movement along a vertical axis, wherein the movement along the vertical axis is indicated by input received from a single axis-hand control, the single-axis hand control including a thumbwheel which is attached to a left handgrip.

18. The method recited in claim 17, wherein determining the desired roll angle includes summing the roll angle offset and the roll angle specified via the three-axis hand control, wherein the roll angle specified via the three-axis hand control is non-zero.

* * * * *